US011326283B2

(12) United States Patent
Carlyle et al.

(10) Patent No.: US 11,326,283 B2
(45) Date of Patent: May 10, 2022

(54) NONWOVEN CELLULOSE FIBER FABRIC WITH HOMOGENEOUSLY MERGED FIBERS

(71) Applicant: LENZING AKTIENGESELLSCHAFT, Lenzing (AT)

(72) Inventors: Tom Carlyle, Spanish Fort, AL (US); Mirko Einzmann, Wels (AT); Gisela Goldhalm, Neufurth (AT); Malcolm John Hayhurst, Bulkington (GB); Katharina Mayer, Altmuenster (AT); Ibrahim Sagerer-Foric, Voecklabruck (AT)

(73) Assignee: LENZING AKTIENGESELLSCHAFT, Lenzing (AT)

( * ) Notice: Subject to any disclaimer, the term of this patent is extended or adjusted under 35 U.S.C. 154(b) by 78 days.

(21) Appl. No.: 16/500,771

(22) PCT Filed: Mar. 28, 2018

(86) PCT No.: PCT/EP2018/057914
§ 371 (c)(1),
(2) Date: Oct. 3, 2019

(87) PCT Pub. No.: WO2018/184938
PCT Pub. Date: Oct. 11, 2018

(65) Prior Publication Data
US 2020/0102677 A1    Apr. 2, 2020

(30) Foreign Application Priority Data

Apr. 3, 2017 (EP) .................................. 17164616

(51) Int. Cl.
*D04H 3/013* (2012.01)
*D04H 3/16* (2006.01)

(52) U.S. Cl.
CPC ............... *D04H 3/013* (2013.01); *D04H 3/16* (2013.01)

(58) Field of Classification Search
CPC .................................. D04H 3/013; D04H 3/16
See application file for complete search history.

(56) References Cited

U.S. PATENT DOCUMENTS

| 6,197,230 | B1 | 3/2001 | Pierre et al. |
| 6,221,487 | B1 | 4/2001 | Luo et al. |

(Continued)

FOREIGN PATENT DOCUMENTS

| CN | 1238015 A | 12/1999 |
| CN | 1304464 A | 7/2001 |

(Continued)

OTHER PUBLICATIONS

Ebeling, et al., "Cellulose meltblown nonwoven using the lyocell-process," Lenzinger Berichte, 86 (2006), pp. 124-131. (Year: 2006).*

(Continued)

*Primary Examiner* — Jeremy R Pierce
(74) *Attorney, Agent, or Firm* — Lewis Roca Rothgerber Christie LLP

(57) ABSTRACT

A nonwoven cellulose fiber fabric, in particular directly manufactured from lyocell spinning solution, wherein the fabric comprises a network of substantially endless fibers, and wherein the fibers are homogeneously merged substantially over the entire fabric.

10 Claims, 8 Drawing Sheets

(56) References Cited

U.S. PATENT DOCUMENTS

| | | | |
|---|---|---|---|
| 6,358,461 B1 * | 3/2002 | Law | D04H 3/013 264/115 |
| 6,685,856 B2 | 2/2004 | Sealey, II et al. | |
| 6,790,527 B1 | 9/2004 | Luo et al. | |
| 2009/0324926 A1 * | 12/2009 | Luo | D04H 3/013 428/311.71 |
| 2010/0162542 A1 | 7/2010 | Luo et al. | |
| 2010/0167029 A1 | 7/2010 | Luo | |
| 2010/0178829 A1 | 7/2010 | Kulkarni | |
| 2015/0053606 A1 | 2/2015 | Sakamoto et al. | |

FOREIGN PATENT DOCUMENTS

| | | | | |
|---|---|---|---|---|
| CN | 1097649 | C | 1/2003 | |
| CN | 101988219 | A * | 3/2011 | D01D 13/02 |
| CN | 103173938 | A | 6/2013 | |
| CN | 104321122 | A | 1/2015 | |
| CN | 103031664 | B | 11/2015 | |
| EP | 1358369 | B1 | 8/2004 | |
| EP | 2013390 | B1 | 8/2015 | |
| JP | 2002517630 | A | 6/2002 | |
| JP | 2004211283 | A | 7/2004 | |
| JP | 2009535521 | A | 10/2009 | |
| JP | 2012046861 | A | 3/2012 | |
| JP | 2013159880 | A | 8/2013 | |
| WO | 98/07911 | A1 | 2/1998 | |
| WO | 98/26122 | A1 | 6/1998 | |
| WO | 99/47733 | A1 | 9/1999 | |
| WO | 99/64649 | A1 | 12/1999 | |
| WO | 2005/106085 | A1 | 11/2005 | |
| WO | 2007/124521 | A1 | 11/2007 | |
| WO | 2007/124522 | A1 | 11/2007 | |

OTHER PUBLICATIONS

Notification of Reason for Refusal issued in parallel Korean Application No. 10-2019-7032534, dated Sep. 9, 2020, 20 pages.
Harms, Haio, "Das Konzept Der Holz „Raffinerie", Lenzing AG, Werkstraβe 1,4860 Lenzing, Austria, Lenzinger Berichte, 86 (2006) 124-131 (Sep. 6, 2006), 161 pages.
The First Office Action issued in parallel Chinese Application No. 201880023867.5, dated Jun. 3, 2021, 23 pages.
Official action issued in parallel Taiwan Application No. 107110767, dated May 28, 2021, 17 pages.
Notice of Reasons for Refusal issued in parallel Japanese Patent Application No. 2020-503096, dated Dec. 22, 2020, 5 pages.
Indian Office action for Patent Application No. 201917037892, dated Nov. 2, 2021, 7 pages.

* cited by examiner

NONWOVEN CELLULOSE FIBER FABRIC WITH HOMOGENEOUSLY MERGED FIBERS

CROSS-REFERENCE TO RELATED APPLICATION(S)

This application is a National Phase Patent Application of International Patent Application Number PCT/EP2018/057914, filed on Mar. 28, 2018, which claims priority of European Patent Application No. 17164616.9, filed Apr. 3, 2017. The entire contents of both of which are incorporated herein by reference.

FIELD OF THE INVENTION

The invention relates to a nonwoven cellulose fiber fabric, a method of manufacturing a nonwoven cellulose fiber fabric, a device for manufacturing a nonwoven cellulose fiber fabric, a product or composite, and a method of use.

BACKGROUND OF THE INVENTION

Lyocell technology relates to the direct dissolution of cellulose wood pulp or other cellulose-based feedstock in a polar solvent (for example n-methyl morpholine n-oxide, which may also be denoted as "amine oxide" or "AO") to produce a viscous highly shear-thinning solution which can be transformed into a range of useful cellulose-based materials. Commercially, the technology is used to produce a family of cellulose staple fibers (commercially available from Lenzing AG, Lenzing, Austria under the trademark TENCEL®) which are widely used in the textile industry. Other cellulose products from lyocell technology have also been used.

Cellulose staple fibers have long been used as a component for conversion to nonwoven webs. However, adaption of lyocell technology to produce nonwoven webs directly would access properties and performance not possible for current cellulose web products. This could be considered as the cellulosic version of the meltblow and spunbond technologies widely used in the synthetic fiber industry, although it is not possible to directly adapt synthetic polymer technology to lyocell due to important technical differences.

Much research has been carried out to develop technology to directly form cellulose webs from lyocell solutions (inter alia, WO 98/26122, WO 99/47733, WO 98/07911, U.S. Pat. No. 6,197,230, WO 99/64649, WO 05/106085, EP 1 358 369, EP 2 013 390). Further art is disclosed in WO 07/124521 A1 and WO 07/124522 A1.

SUMMARY OF THE INVENTION

There may be a need to provide a cellulose-based fabric having a high mechanical stability.

In order to achieve the object defined above, a nonwoven cellulose fiber fabric, a method of manufacturing a nonwoven cellulose fiber fabric, a device for manufacturing a nonwoven cellulose fiber fabric, a product or composite, and a method of use are provided.

According to an exemplary embodiment of the invention, a (in particular solution-blown) nonwoven cellulose fiber fabric is provided (which is in particular directly (in particular in an in situ process or in a continuous process executable in a continuously operating production line) manufactured from lyocell spinning solution), wherein the fabric comprises a network of substantially endless fibers, and wherein the fibers (in particular at least 10% of the fibers) are homogeneously merged substantially over the entire fabric.

According to another exemplary embodiment, a method of manufacturing (in particular solution-blown) nonwoven cellulose fiber fabric directly from lyocell spinning solution is provided, wherein the method comprises extruding the lyocell spinning solution through a jet with orifices supported by a gas flow into a coagulation fluid atmosphere (in particular an atmosphere of dispersed coagulation fluid) to thereby form substantially endless fibers, collecting the fibers on a fiber support unit to thereby form the fabric, and adjusting process parameters so that the fibers (in particular at least 10% of the fibers) are homogeneously merged substantially over the entire fabric.

According to a further exemplary embodiment, a device for manufacturing (in particular solution-blown) nonwoven cellulose fiber fabric directly from lyocell spinning solution is provided, wherein the device comprises a jet with orifices configured for extruding the lyocell spinning solution supported by a gas flow, a coagulation unit configured for providing a coagulation fluid atmosphere for the extruded lyocell spinning solution to thereby form substantially endless fibers, a fiber support unit configured for collecting the fibers to thereby form the fabric, and a control unit (such as a processor configured for executing program code for manufacturing the nonwoven cellulose fiber fabric directly from the lyocell spinning solution) configured for adjusting process parameters so that the fibers (in particular at least 10% of the fibers) are homogeneously merged substantially over the entire fabric.

According to still another exemplary embodiment, a product or composite is provided which comprises a fabric having the above mentioned properties.

According to yet another embodiment, a nonwoven cellulose fiber fabric having the above-mentioned properties is used for at least one of the group consisting of a wipe, a dryer sheet, a filter, a hygiene product, a medical application product, a geotextile, agrotextile, clothing, a product for building technology, an automotive product, a furnishing, an industrial product, a product related to beauty, leisure, sports or travel, and a product related to school or office.

In the context of this application, the term "nonwoven cellulose fiber fabric" (which may also be denoted as nonwoven cellulose filament fabric) may particularly denote a fabric or web composed of a plurality of substantially endless fibers. The term "substantially endless fibers" has in particular the meaning of filament fibers having a significantly longer length than conventional staple fibers. In an alternative formulation, the term "substantially endless fibers" may in particular have the meaning of a web formed of filament fibers having a significantly smaller amount of fiber ends per volume than conventional staple fibers. In particular, endless fibers of a fabric according to an exemplary embodiment of the invention may have an amount of fiber ends per volume of less than 10,000 ends/cm$^3$, in particular less than 5,000 ends/cm$^3$. For instance, when staple fibers are used as a substitute for cotton, they may have a length of 38 mm (corresponding to a typical natural length of cotton fibers). In contrast to this, substantially endless fibers of the nonwoven cellulose fiber fabric may have a length of at least 200 mm, in particular at least 1000 mm. However, a person skilled in the art will be aware of the fact that even endless cellulose fibers may have interruptions, which may be formed by processes during and/or after fiber formation. As a consequence, a nonwoven cellulose fiber fabric made of substantially endless cellulose fibers has a significantly lower number of fibers per mass compared to nonwoven fabric made from staple fibers of the same denier. A nonwoven cellulose fiber fabric may be manufactured by spinning a plurality of fibers and by attenuating and stretching the latter towards a preferably moving fiber support unit. Thereby, a three-dimensional network or web of cellulose fibers is formed, constituting the nonwoven cellulose fiber fabric. The fabric may be made of cellulose as main or only constituent.

In the context of this application, the term "lyocell spinning solution" may particularly denote a solvent (for example a polar solution of a material such as N-methylmorpholine, NMMO, "amine oxide" or "AO") in which cellulose (for instance wood pulp or other cellulose-based feedstock) is dissolved. The lyocell spinning solution is a solution rather than a melt. Cellulose filaments may be generated from the lyocell spinning solution by reducing the concentration of the solvent, for instance by contacting said filaments with water. The process of initial generation of cellulose fibers from a lyocell spinning solution can be described as coagulation.

In the context of this application, the term "gas flow" may particularly denote a flow of gas such as air substantially parallel to the moving direction of the cellulose fiber or its preform (i.e. lyocell spinning solution) while and/or after the lyocell spinning solution leaves or has left the spinneret.

In the context of this application, the term "coagulation fluid" may particularly denote a non-solvent fluid (i.e. a gas and/or a liquid, optionally including solid particles) which has the capability of diluting the lyocell spinning solution and exchanging with the solvent to such an extent that the cellulose fibers are formed from the lyocell filaments. For instance, such a coagulation fluid may be water mist.

In the context of this application, the term "process parameters" may particularly denote all physical parameters and/or chemical parameters and/or device parameters of substances and/or device components used for manufacturing nonwoven cellulose fiber fabric which may have an impact on the properties of the fibers and/or the fabric, in particular on fiber diameter and/or fiber diameter distribution. Such process parameters may be adjustable automatically by a control unit and/or manually by a user to thereby tune or adjust the properties of the fibers of the nonwoven cellulose fiber fabric. Physical parameters which may have an impact on the properties of the fibers (in particular on their diameter or diameter distribution) may be temperature, pressure and/or density of the various media involved in the process (such as the lyocell spinning solution, the coagulation fluid, the gas flow, etc.). Chemical parameters may be concentration, amount, pH value of involved media (such as the lyocell spinning solution, the coagulation fluid, etc.). Device parameters may be size of and/or distances between orifices, distance between orifices and fiber support unit, speed of transportation of fiber support unit, the provision of one or more optional in situ post processing units, the gas flow, etc.

The term "fibers" may particularly denote elongated pieces of a material comprising cellulose, for instance roughly round or non-regularly formed in cross-section, optionally twisted with other fibers. Fibers may have an aspect ratio which is larger than 10, particularly larger than 100, more particularly larger than 1000. The aspect ratio is the ratio between the length of the fiber and a diameter of the fiber. Fibers may form networks by being interconnected by merging (so that an integral multi-fiber structure is formed) or by friction (so that the fibers remain separate but are weakly mechanically coupled by a friction force exerted when mutually moving the fibers being in physical contact with one another). Fibers may have a substantially cylindrical form which may however be straight, bent, kinked, or curved. Fibers may consist of a single homogenous material (i.e. cellulose). However, the fibers may also comprise one or more additives. Liquid materials such as water or oil may be accumulated between the fibers.

In the context of this document, a "jet with orifices" (which may for instance be denoted as an "arrangement of orifices") may be any structure comprising an arrangement of orifices which are linearly arranged.

In the context of this application, the term "merging" may particularly denote an integral interconnection of different fibers at the respective merging position which results in the formation of one integrally connected fiber structure composed of the previously separate fiber preforms. Merging may be denoted as a fiber-fiber connection being established during coagulation of one, some or all of the merged fibers. Interconnected fibers may strongly adhere to one another at a respective merging position without a different additional material (such as a separate adhesive) so as to form a common structure. Separation of merged fibers may require destruction of the fiber network or part thereof.

In the context of this application, the term "homogeneously merged substantially over the entire fabric" may particularly denote that the amount of merging positions between fibers per volumetric area are very similar in different spatial regions of the fiber. The skilled person will however understand that at an edge of a fabric (where the latter may for instance be cut off), the physical properties of the fabric in terms of merging may be not comparable with the properties within an interior of the fabric. Therefore, the mentioned homogeneity shall be present essentially over the entire extension of the fabric (in particular in a central portion thereof), while edge effects along an exterior perimeter of the fabric which may artificially result in a local deviation of the mentioned homogeneity shall be disregarded.

According to an exemplary embodiment, a nonwoven cellulose fiber fabric is provided in which some or all of the fibers are integrally connected to one another by merging. Merging may be triggered by a corresponding control of the process parameters of a method of manufacturing the nonwoven cellulose fiber fabric. In particular, coagulation of filaments of lyocell spinning solution may be triggered (or at least completed) after the first contact between these filaments being not yet in the precipitated solid fiber state. Thereby, interaction between these filaments while still being in the solution phase and then or thereafter converting them into the solid-state phase by coagulation allows to properly adjust the merging characteristics. A degree of spatial homogeneity of the merging is a powerful parameter which can be used for adjusting the properties of the manufactured fabric. When the number of merging positions between fibers per volume of the fabric is very similar over the entire fabric, the fabric shows a substantially spatially independent value of the mechanical strength and at the same time provides a substantially uniform elasticity within the entire fabric. Therefore, the fabric may be rendered substantially free of mechanical weak points and allows at each and every position that exerted force peaks are distributed over the fabric due to the homogeneous elasticity. With such a homogeneous merging distribution, it has turned out that a tailored nonwoven fabric with respect to mechanical properties can be obtained with reasonable effort. In a preferred embodiment, merging between fibers is triggered by bringing different fiber preforms in form of lyocell spinning solution in direct contact with one another prior to coagulation. By such a coagulation process, single material common precipitation of the fibers is executed, thereby forming the merging positions.

In the following, further exemplary embodiments of the nonwoven cellulose fiber fabric, the method of manufacturing a nonwoven cellulose fiber fabric, the device for manufacturing a nonwoven cellulose fiber fabric, the product or composite, and the method of use are described.

In an embodiment, a merging factor of the fibers differs over substantially the entire fabric by an absolute value of not more than 20%, in particular by not more than 10%. Multiple samples of a fabric (wherein for instance each sample may have an area of 1×1 cm$^2$) may be used for determining the respective local merging factor of the respective samples. A difference between the largest so determined merging factor (in percent) and a smallest so determined merging factor (in percent) may be not more than 20%, in particular not more than 10%. For instance, if the largest merging factor among the samples is 70% and the smallest merging factor among the samples is 65%, the mentioned difference is 5% (70%-65%) and hence even not more than 10%. Descriptively speaking, the merging factor which is defined in the following is indicative of the number of merging positions per size unit of the fabric. A homogeneous value of the merging factor over the entire fabric in the described limits ensures that the fabric does not have a tendency of curing in the event of mechanical load, since the mentioned homogeneity does not generate neither regions of locally low stability nor generate regions of excessive stiffness. Forces may therefore be equilibrated over the fabric without damaging the latter.

For determining the merging factor (which may also be denoted as area merging factor) of fabric, the following determination process may be carried out: A square sample of the fabric may be optically analyzed. A circle, which has a diameter which has to stay fully inside the square sample, is drawn around each merging position (in particular merging point and/or merging line) of fibers crossing at least one of the diagonals of the square sample. The size of the circle is determined so that the circle encompasses the merging area between the merged fibers. An arithmetic average of the values of the diameter of the determined circles is calculated. The merging factor is calculated as ratio between the averaged diameter value and the diagonal length of the square sample, and may be given in percent.

A merging factor of 0% corresponds to a fabric without merging points, i.e. completely separate fibers interacting with one another only by friction. A merging factor of 100% corresponds to a fabric consisting of merging points, i.e. completely integral fibers forming a continuous structure such as a film. By adjusting the merging factor, also the physical properties (in particular the mechanical stability) of the corresponding fabric may be precisely adjusted.

In an embodiment, the merging factor of at least part of the fibers is in a range between 0.1% and 100%, in particular in a range between 0.2% and 50%, more particularly in a range between 0.5% and 15%.

In an embodiment, the fabric is configured so that a ratio between tensile strength and basis weight (specific tensile strength) is at least 0.5 Nm$^2$/g, in particular at least 1.0 Nm$^2$/g. With the nonwoven cellulose fiber fabric with pronounced merging homogeneity according to an exemplary embodiment of the invention, a higher mechanical stability may be obtained for a given grammage (i.e. weight per area of sheet like fabric), or a reduced grammage may be obtained at the same mechanical stability.

In an embodiment, a value of the Young modulus differs over substantially the entire fabric by not more than 20%, in particular by not more than 10%. Multiple samples of a fabric (wherein for instance each sample may have an area of 1×1 cm$^2$) may be used for determining the respective local Young modulus of the respective samples. A difference between the largest so determined Young modulus and a smallest so determined Young modulus may be not more than 20%, in particular not more than 10%, when divided by the largest so determined Young modulus. Young's modulus, also known as the elastic modulus, is a measure of the stiffness of a solid material and is a mechanical property of linear elastic solid materials. Young's modulus defines the relationship between stress (force per unit area) and strain (proportional deformation) in a material. When the Young modulus is substantially uniform over the entire extension of the fabric and varies by less than 20% or even less than 10%, it can be ensured that there are no local regions of excessive elasticity or excessive rigidity so that the elastic properties of the fabric do not promote undesired tearing thereof.

In an embodiment, a value of the tensile strength differs over substantially the entire fabric by not more than 20%, in particular by not more than 10%. Multiple samples of a fabric (wherein for instance each sample may have an area of 1×1 cm$^2$) may be used for determining the respective local tensile strength of the respective samples. A difference between the largest so determined tensile strength and a smallest so determined tensile strength may be not more than 20%, in particular not more than 10%, when divided by the largest so determined tensile strength. The tensile strength is the capacity of a material or structure to withstand loads tending to elongate. In other words, tensile strength resists tension when the fabric is pulled apart. Tensile strength is measured by the standard DIN EN 29 073 part 3 or ISO 9073-3 (F31_5).

In an embodiment, smoothness, respectively the specific hand, of the fabric measured with a "Handle-O-Meter" on the basis of the nonwoven standard WSP90.3 is in a range between 2 mNm$^2$/g and 70 mNm$^2$/g. By varying the process parameters of the described manufacturing method, smoothness may hence be varied over a broad range. When implementing merging between fibers, this may already ensure sufficient stability of the fabric. The smoothness of the surface layer—even a very high degree of smoothness—may then be freely adjusted without any danger that stability of the fabric may suffer from this.

The mentioned smoothness of a fabric may be measured with a "Handle-O-Meter" (as commercially available by Thwing-Albert Instrument Co., Philadelphia, Pa.) on the basis of the nonwoven standard WSP90.3. For determining smoothness of the fabric, a pivoting arm of the "Handle-O-Meter" is lowered and presses a sample (for instance having square dimensions of 10 cm×10 cm) of fabric into an adjustable parallel slit. The force is measured which is required in order to press the sample into the slit. During this procedure, a bending force and a friction force are exerted on the sample. The average value from the measurements in CD direction and in MD direction correspond to an average force which is required to press the sample through the slit. The ratio between the average force (for instance given in mN) and basis weight of the fabric (for instance given in g/m$^2$) gives a smoothness value, measured as specific hand, in mNm$^2$/g which is indicative for the smoothness of the fabric material.

In an embodiment, the fibers have a copper content of less than 5 ppm and/or have a nickel content of less than 2 ppm. The ppm values mentioned in this application all relate to mass (rather than to volume). Apart from this, the heavy metal contamination of the fibers or the fabric may be not more than 10 ppm for each individual heavy metal element. Due to the use of a lyocell spinning solution as a basis for the formation of the endless fiber-based fabric (in particular when involving a solvent such as N-methyl-morpholine, NMMO), the contamination of the fabric with heavy metals such as copper or nickel (which may cause allergic reactions of a user) may be kept extremely small. Due to the concept of direct merging under certain conditions adjustable by process control, no extra material (such as a binder or the like) needs to be introduced in the process for interconnecting the fibers. This keeps contaminations of the fabric very low and also contributes to the homogeneity of the cellulose fabric.

In an embodiment, merging positions (i.e. positions of fiber-fiber merging within the fabric) comprise a merging point at which fibers are merged with a point contact. A merging point may be a dot-like structure made of the same material as the interconnected fibers.

In an embodiment, the merging positions comprise a merging line along which fibers are mutually aligned side-by-side at least over a portion of their length to form a superordinate fiber structure. Such a merging line may be considered as a merging position having an oblong shape of a line significantly larger than a diameter of the fibers connected along the merging line. A merging line may hence be an extended structure connecting fibers along a section along which the fibers extend in parallel or side-by-side.

In an embodiment, the merging positions consist of the same material as the merged fibers. Thus, the merging positions may be formed by cellulose material resulting directly from the coagulation of lyocell spinning solution. This not only renders the separate provision of a fiber connection material (such as an adhesive or a binder) dispensable, but also keeps the fabric clean and made of a single material, thereby highly homogeneous.

In an embodiment, different ones of the fibers are located at least partially in different distinguishable (i.e. showing a visible separation or interface region in between the layers) layers. More specifically, fibers of different layers are integrally merged at at least one merging position between the layers. Hence, different ones of the fibers being located at least partially in different distinguishable layers (which may be identical or which may differ concerning one or more parameters such as merging factor, fiber diameter, etc.) may be integrally connected at at least one merging position. For instance, two (or more) different layers of a fabric may be formed by serially aligning two (or more) jets with orifices through which lyocell spinning solution is extruded for coagulation and fiber formation. When such an arrangement is combined with a moving fiber support unit (such as a conveyor belt with a fiber accommodation surface), a first layer of fibers is formed on the fiber support unit by the first jet, and the second jet forms a second layer of fibers on the first layer when the moving fiber support unit reaches the position of the second jet. The process parameters of this method may be adjusted so that merging points are formed between the first layer and the second layer. In particular, fibers of the second layer under formation being not yet fully cured or solidified by coagulation may for example still have exterior skin or surface regions which are still in the liquid lyocell solution phase and not yet in the fully cured solid state. When such pre-fiber structures come into contact with one another and fully cure into the solid fiber state thereafter, this may result in the formation of two merged fibers at an interface between different layers. The higher the number of merging positions in a spatially homogeneously merged fabric, the higher is the stability of the interconnection between the layers of the fabric. Thus, controlling merging allows to control rigidity of the connection between the layers of the fabric. Merging can be controlled, for example, by adjusting the degree of curing or coagulation before pre-fiber structures of a respective layer reach the fiber support plate on an underlying layer of fibers or pre-fiber structures. By merging of fibers of different layers at an interface there between, undesired separation of the layers may be prevented.

In an embodiment, adjusting the process parameters for adjusting merging comprises forming at least part of the merging positions after the lyocell spinning solution has left the orifices and before the lyocell spinning solution has reached the fiber support unit. This may be achieved for example by triggering an interaction between strands of lyocell spinning solution extruded through different ones of the orifices while being accelerated downwardly. For example, the gas flow may be adjusted in terms of strength and direction so that different strands or filaments of the (not yet fully coagulated) spinning solution are forced to get into interaction with one another in a lateral direction before reaching the fiber support unit. It is also possible that the gas flow is operated to be close or in the regime of turbulent flow so as to promote a mutual interaction between the various preforms of the fibers. Therefore, the individual preforms of the fibers may be brought in contact with one another prior to coagulation, thereby forming merging positions.

In an embodiment, adjusting the process parameters for adjusting merging comprises forming at least part of the merging positions after the lyocell spinning solution has reached the fiber support unit by triggering coagulation of at least part of the fibers when laying on the fiber support unit. In such an embodiment, the process of coagulation may be delayed intentionally (which may be adjusted by a corresponding operation of the coagulation unit, in particular by correspondingly adjusting the properties and the position of supply of the coagulation fluid). More specifically, the process of coagulation may be delayed until the spinning solution has reached the fiber support plate. In such an embodiment, the preforms of the fibers, still prior to coagulation, are accelerated down to the fiber support plate and thereby get into contact with other preforms of the fiber, also still prior to coagulation. Spinning solution of different strands or preforms may thereby be forced to flow into contact with one another, and only thereafter coagulation may be triggered or completed. Thus, coagulation following initial contact between different preforms of fibers being still in the non-coagulated state is an efficient measure of forming merging positions.

In an embodiment, adjusting the process parameters for adjusting merging comprises serially arranging multiple jets with orifices along a movable fiber support unit, depositing a first layer of fibers on the fiber support unit, and depositing a second layer of fibers on the first layer before coagulation of at least part of the fibers at an interface between the layers has been completed. For each layer to be formed, the process parameters of operating the corresponding jet with orifices may be adjusted so as to obtain a layer specific coagulation behavior. Layer specific coagulation behavior of the different layers may be adjusted so that merging positions are formed within the respective layer and preferably between adjacent layers. More specifically, process control may be adjusted so that merging positions are formed between two adjacent layers by promoting coagulation of both layers only after initial contact between spinning solution related to the different layers.

In an embodiment, adjusting the process parameters for adjusting merging comprises triggering formation of such an amount of merging positions that a substantially continuous film-shaped fabric is obtained. This embodiment relates a merging factor of 100%. When excessive merging is carried out, a continuous flat cellulose layer rather than a fiber network is obtained as the fabric (see for instance FIG. 10).

In an embodiment, the method further comprises further processing the fibers and/or the fabric after collection on the fiber support unit but preferably still in situ with the formation of the nonwoven cellulose fiber fabric with endless fibers. Such in situ processes may be those processes being carried out before the manufactured (in particular substantially endless) fabric is stored (for instance wound by a winder) for shipping to a product manufacture destination. For instance, such a further processing or post processing may involve hydroentanglement. Hydroentanglement may be denoted as a bonding process for wet or dry fibrous webs, the resulting bonded fabric being a nonwoven. Hydroentanglement may use fine, high pressure jets of water which penetrate the web, hit a fiber support unit (in particular a conveyor belt) and bounce back causing the fibers to entangle. A corresponding compression of the fabric may render the fabric more compact and mechanically more stable. Additionally or alternatively to hydroentanglement, steam treatment of the fibers with a pressurized steam may be carried out. Additionally or alternatively, such a further processing or post processing may involve a needling treatment of the manufactured fabric. A needle punching system may be used to bond the fibers of the fabric or web. Needle punched fabrics may be produced when barbed needles are pushed through the fibrous web forcing some fibers through the web, where they remain when the needles are withdrawn. Yet another further processing or post processing treatment of the web or fabric is an impregnating treatment. Impregnating the network of endless fibers may involve the application of one or more chemicals (such as a softening agent, a hydrophobic agent, and antistatic agent, etc.) on the fabric. Still another further processing treatment of the fabric is calendering. Calendering may be denoted as a finishing process for treating the fabric and may employ a calender to smooth, coat, and/or compress the fabric.

A nonwoven cellulose fiber fabric according to an exemplary embodiment of the invention may also be combined (for instance in situ or in a subsequent process) with one or more other materials, to thereby form a composite according to an exemplary embodiment of the invention. Exemplary materials, which can be combined with the fabric for forming such a composite may be selected from a group of materials comprising, but not being limited to, the following materials or combinations thereof: fluff pulp, a fiber suspension, a wetlaid nonwoven, an airlaid nonwoven, a spunbond web, a meltblown web, a carded spunlaced or needlepunched web or other sheet like structures made of various materials. In an embodiment, the connection between the different materials can be done by (but not limited to) one or a combination of the following processes: merging, hydroentanglement, needle punching, hydrogen bonding, thermobonding, gluing by a binder, laminating, and/or calendering.

In the following, exemplary advantageous products comprising, or uses of, a nonwoven cellulose fiber fabric according to exemplary embodiments of the invention are summarized:

Particular uses of the webs, either 100% cellulose fiber webs, or for example webs comprising or consisting of two or more fibers, or chemically modified fibers or fibers with incorporated materials such as anti-bacterial materials, ion exchange materials, active carbon, nano particles, lotions, medical agents or fire retardants, or bicomponent fibers may be as follows:

The nonwoven cellulose fiber fabric according to exemplary embodiments of the invention may be used for manufacturing wipes such as baby, kitchen, wet wipes, cosmetic, hygiene, medical, cleaning, polishing (car, furniture), dust, industrial, duster and mops wipes.

It is also possible that the nonwoven cellulose fiber fabric according to exemplary embodiments of the invention is used for manufacturing a filter. For instance, such a filter may be an air filter, a HVAC, air condition filter, flue gas filter, liquid filters, coffee filters, tea bags, coffee bags, food filters, water purification filter, blood filter, cigarette filter; cabin filters, oil filters, cartridge filter, vacuum filter, vacuum cleaner bag, dust filter, hydraulic filter, kitchen filter, fan filter, moisture exchange filters, pollen filter, HEVAC/HEPA/ULPA filters, beer filter, milk filter, liquid coolant filter and fruit juices filters.

In yet another embodiment, the nonwoven cellulose fiber fabric may be used for manufacturing absorbent hygiene products. Examples thereof are an acquisition layer, a coverstock, a distribution layer, an absorbent cover, sanitary pads, topsheets, backsheets, leg cuffs, flushable products, pads, nursing pads, disposal underwear, training pants, face masks, beauty facial masks, cosmetic removal pads, washcloths, diapers, and sheets for a laundry dryer releasing an active component (such as a textile softener).

In still another embodiment, the nonwoven cellulose fiber fabric may be used for manufacturing a medical application product. For instance, such medical application products may be disposable caps, gowns, masks and shoe cover, wound care products, sterile packaging products, coverstock products, dressing materials, one way clothing, dialyses products, nasal strips, adhesives for dental plates, disposal underwear, drapes, wraps and packs, sponges, dressings and wipes, bed linen, transdermal drug delivery, shrouds, underpads, procedure packs, heat packs, ostomy bag liners, fixation tapes and incubator mattresses.

In yet another embodiment, the nonwoven cellulose fiber fabric may be used for manufacturing geotextiles. This may involve the production of crop protection covers, capillary matting, water purification, irrigation control, asphalt overlay, soil stabilisation, drainage, sedimentation and erosion control, pond liners, impregnation based, drainage channel liners, ground stabilisation, pit linings, seed blankets, weed control fabrics, greenhouse shading, root bags and biodegradable plant pots. It is also possible to use the nonwoven cellulose fiber fabric for a plant foil (for instance providing a light protection and/or a mechanical protection for a plant, and/or providing the plant or soil with dung or seed).

In another embodiment, the nonwoven cellulose fiber fabric may be used for manufacturing clothing. For example, interlinings, clothing insulation and protection, handbag components, shoe components, belt liners, industrial headwear/foodwear, disposable workwear, clothing and shoe bags and thermal insulation may be manufactured on the basis of such fabric.

In still another embodiment, the nonwoven cellulose fiber fabric may be used for manufacturing products used for building technology. For instance, roofing and tile underlay, underslating, thermal and noise insulation, house wrap, facings for plaster board, pipe wrap, concrete moulding layers, foundations and ground stabilisation, vertical drainages, shingles, roofing felts, noise abatement, reinforcement, sealing material, and damping material (mechanical) may be manufactured using such fabric.

In still another embodiment, the nonwoven cellulose fiber fabric may be used for manufacturing an automotive product. Examples are a cabin filter, boot liners, parcel shelves, heat shields, shelf trim, moulded bonnet liners, boot floor covering, oil filter, headliners, rear parcel shelves, decorative fabrics, airbags, silencer pads, insulation materials, car covers, underpadding, car mats, tapes, backing and tufted carpets, seat covers, door trim, needled carpet, and auto carpet backing.

Still another field of application of fabric manufactured according to exemplary embodiments of the invention are furnishings, such as furniture, construction, insulator to arms and backs, cushion thicking, dust covers, linings, stitch reinforcements, edge trim materials, bedding constructions, quilt backing, spring wrap, mattress pad components, mattress covers, window curtains, wall coverings, carpet backings, lampshades, mattress components, spring insulators, sealings, pillow ticking, and mattress ticking.

In yet another embodiment, the nonwoven cellulose fiber fabric may be used for manufacturing industrial products. This may involve electronics, floppy disc liners, cable insulation, abrasives, insulation tapes, conveyor belts, noise absorbent layers, air conditioning, battery separators, acid systems, anti-slip matting stain removers, food wraps, adhesive tape, sausage casing, cheese casing, artificial leather, oil recovery booms and socks, and papermaking felts.

Nonwoven cellulose fiber fabric according to exemplary embodiments of the invention is also appropriate for manufacturing products related to leisure and travel. Examples for such an application are sleeping bags, tents, luggage, handbags, shopping bags, airline headrests, CD-protection, pillowcases, and sandwich packaging.

Still another field of application of exemplary embodiment of the invention relates to school and office products. As examples, book covers, mailing envelopes, maps, signs and pennants, towels, and flags shall be mentioned.

BRIEF DESCRIPTION OF THE DRAWINGS

The invention will be described in more detail hereinafter with reference to examples of embodiment but to which the invention is not limited.

DETAILED DESCRIPTION OF EXEMPLARY EMBODIMENTS

Figure 1:
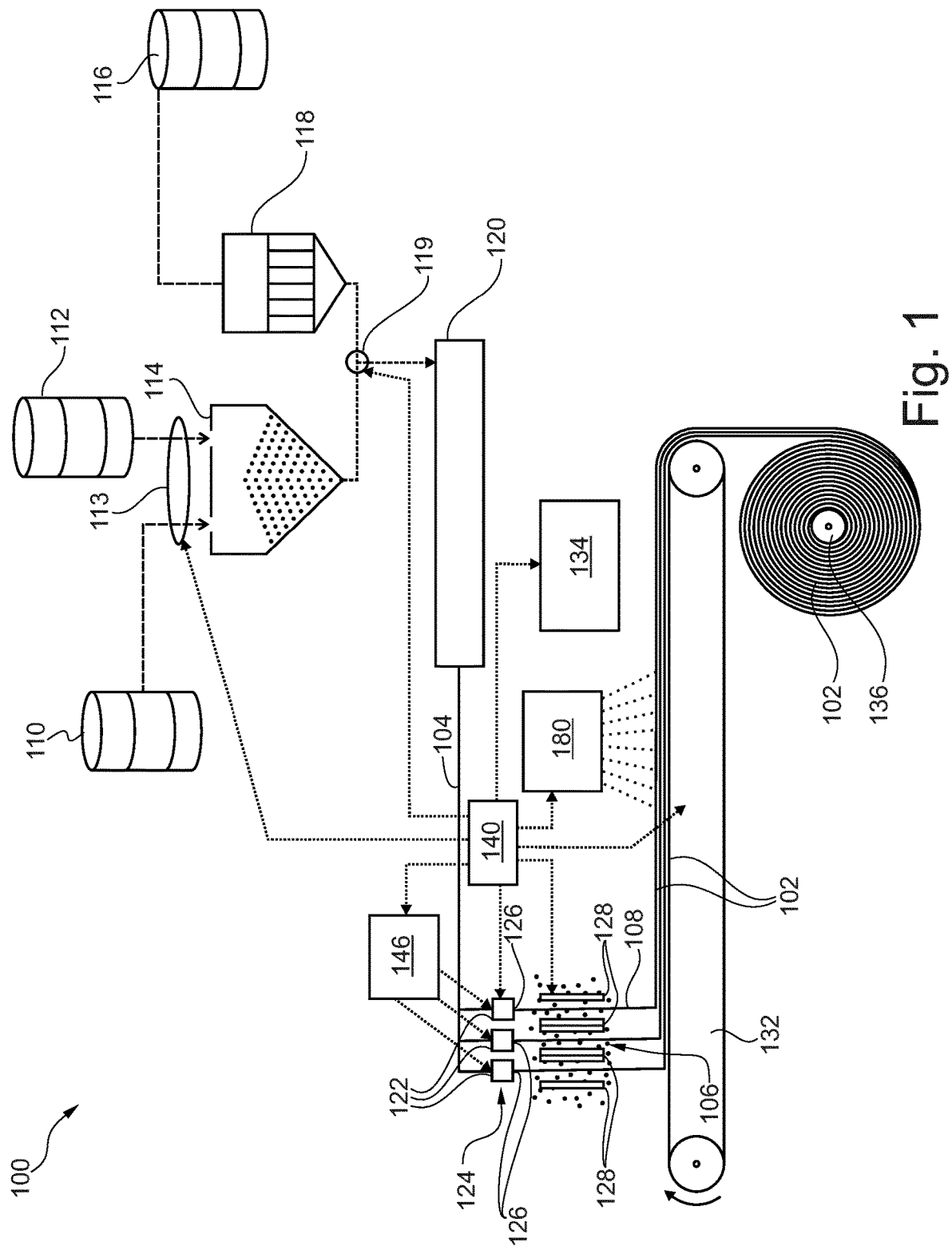
FIG. 1 illustrates a device for manufacturing nonwoven cellulose fiber fabric which is directly formed from lyocell spinning solution being coagulated by a coagulation fluid according to an exemplary embodiment of the invention.

The illustrations in the drawings are schematic. In different drawings similar or identical elements are provided with the same reference labels.

FIG. 1 illustrates a device 100 according to an exemplary embodiment of the invention for manufacturing nonwoven cellulose fiber fabric 102 which is directly formed from lyocell spinning solution 104. The latter is at least partly coagulated by a coagulation fluid 106 to be converted into partly-formed cellulose fibers 108. By the device 100, a lyocell solution blowing process according to an exemplary embodiment of the invention may be carried out. In the context of the present application, the term "lyocell solution-blowing process" may particularly encompass processes which can result in essentially endless filaments or fibers 108 of a discrete length or mixtures of endless filaments and fibers of discrete length being obtained. As further described below, nozzles each having an orifice 126 are provided through which cellulose solution or lyocell spinning solution 104 is ejected together with a gas stream or gas flow 146 for manufacturing the nonwoven cellulose fiber fabric 102 according to an exemplary embodiment of the invention.

As can be taken from FIG. 1, wood pulp 110, other cellulose-based feedstock or the like may be supplied to a storage tank 114 via a metering unit 113. Water from a water container 112 is also supplied to the storage tank 114 via metering unit 113. Thus, the metering unit 113, under control of a control unit 140 described below in further detail, may define relative amounts of water and wood pulp 110 to be supplied to the storage tank 114. A solvent (such as N-methyl-morpholine, NMMO) accommodated in a solvent container 116 may be concentrated in a concentration unit 118 and may then be mixed with the mixture of water and wood pulp 110 or other cellulose-based feedstock with definable relative amounts in a mixing unit 119. Also the mixing unit 119 can be controlled by the control unit 140. Thereby, the water-wood pulp 110 medium is dissolved in the concentrated solvent in a dissolving unit 120 with adjustable relative amounts, thereby obtaining lyocell spinning solution 104. The aqueous lyocell spinning solution 104 can be a honey-viscous medium composed of (for instance 5 mass % to 15 mass %) cellulose comprising wood pulp 110 and (for instance 85 mass % to 95 mass %) solvent.

The lyocell spinning solution 104 is forwarded to a fiber formation unit 124 (which may be embodied as or which may comprise a number of spinning beams or jets 122). For instance, the number of orifices 126 of the jets 122 may be larger than 50, in particular larger than 100. In one embodiment, all orifices 126 of a fiber formation unit 124 (which may comprise a number of spinnerets or jets 122) of orifices 126 of the jets 122 may have the same size and/or shape. Alternatively, size and/or shape of different orifices 126 of one jet 122 and/or orifices 126 of different jets 122 (which may be arranged serially for forming a multilayer fabric) may be different.

When the lyocell spinning solution 104 passes through the orifices 126 of the jets 122, it is divided into a plurality of parallel strands of lyocell spinning solution 104. A vertically oriented gas flow, i.e. being oriented substantially parallel to spinning direction, forces the lyocell spinning solution 104 to transform into increasingly long and thin strands which can be adjusted by changing the process conditions under control of control unit 140. The gas flow may accelerate the lyocell spinning solution 104 along at least a part of its way from the orifices 126 to a fiber support unit 132.

While the lyocell spinning solution 104 moves through the jets 122 and further downward, the long and thin strands of the lyocell spinning solution 104 interact with non-solvent coagulation fluid 106. The coagulation fluid 106 is advantageously embodied as a vapor mist, for instance an aqueous mist. Process relevant properties of the coagulation fluid 106 are controlled by one or more coagulation units 128, providing the coagulation fluid 106 with adjustable properties. The coagulation units 128 are controlled, in turn, by control unit 140. Preferably, respective coagulation units 128 are provided between the individual nozzles or orifices 126 for individually adjusting properties of respective layers of fabric 102 being produced. Preferably, each jet 122 may have two assigned coagulation units 128, one from each side. The individual jets 122 can thus be provided with individual portions of lyocell spinning solution 104 which may also be adjusted to have different controllable properties of different layers of manufactured fabric 102.

When interacting with the coagulation fluid 106 (such as water), the solvent concentration of the lyocell spinning solution 104 is reduced, so that the cellulose of the former e.g. wood pulp 110 (or other feedstock) is at least partly coagulated as long and thin cellulose fibers 108 (which may still contain residual solvent and water).

During or after initial formation of the individual cellulose fibers 108 from the extruded lyocell spinning solution 104, the cellulose fibers 108 are deposited on fiber support unit 132, which is here embodied as a conveyor belt with a planar fiber accommodation surface. The cellulose fibers 108 form a nonwoven cellulose fiber fabric 102 (illustrated only schematically in FIG. 1). The nonwoven cellulose fiber fabric 102 is composed of continuous and substantially endless filaments or fibers 108.

Although not shown in FIG. 1, the solvent of the lyocell spinning solution 104 removed in coagulation by the coagulation unit 128 and in washing in a washing unit 180 can be at least partially recycled.

While being transported along the fiber support unit 132, the nonwoven cellulose fiber fabric 102 can be washed by washing unit 180 supplying wash liquor to remove residual solvent and may then be dried. It can be further processed by an optional but advantageous further processing unit 134. For instance, such a further processing may involve hydroentanglement, needle punching, impregnation, steam treatment with a pressurized steam, calendering, etc.

The fiber support unit 132 may also transport the nonwoven cellulose fiber fabric 102 to a winder 136 on which the nonwoven cellulose fiber fabric 102 may be collected as a substantially endless sheet. The nonwoven cellulose fiber fabric 102 may then be shipped as roll-good to an entity manufacturing products such as wipes or textiles based on the nonwoven cellulose fiber fabric 102.

As indicated in FIG. 1, the described process may be controlled by control unit 140 (such as a processor, part of a processor, or a plurality of processors). The control unit 140 is configured for controlling operation of the various units shown in FIG. 1, in particular one or more of the metering unit 113, the mixing unit 119, the fiber formation unit 124, the coagulation unit(s) 128, the further processing unit 134, the dissolution unit 120, the washing unit 118, etc. Thus, the control unit 140 (for instance by executing computer executable program code, and/or by executing control commands defined by a user) may precisely and flexibly define the process parameters according to which the nonwoven cellulose fiber fabric 102 is manufactured. Design parameters in this context are air flow along the orifices 126, properties of the coagulation fluid 106, drive speed of the fiber support unit 132, composition, temperature and/or pressure of the lyocell spinning solution 104, etc. Additional design parameters which may be adjusted for adjusting the properties of the nonwoven cellulose fiber fabric 102 are number and/or mutual distance and/or geometric arrangement of the orifices 126, chemical composition and degree of concentration of the lyocell spinning solution 104, etc. Thereby, the properties of the nonwoven cellulose fiber fabric 102 may be properly adjusted, as described below. Such adjustable properties (see below detailed description) may involve one or more of the following properties: diameter and/or diameter distribution of the fibers 108, amount and/or regions of merging between fibers 108, a purity level of the fibers 108, properties of a multilayer fabric 102, optical properties of the fabric 102, fluid retention and/or fluid release properties of the fabric 102, mechanical stability of the fabric 102, smoothness of a surface of the fabric 102, cross-sectional shape of the fibers 108, etc.

Although not shown, each spinning jet 122 may comprise a polymer solution inlet via which the lyocell spinning solution 104 is supplied to the jet 122. Via an air inlet, a gas flow 146 can be applied to the lyocell spinning solution 104. Starting from an interaction chamber in an interior of the jet 122 and delimited by a jet casing, the lyocell spinning solution 104 moves or is accelerated (by the gas flow 146 pulling the lyocell spinning solution 104 downwardly) downwardly through a respective orifice 126 and is laterally narrowed under the influence of the gas flow 146 so that continuously tapering cellulose filaments or cellulose fibers 108 are formed when the lyocell spinning solution 104 moves downwardly together with the gas flow 146 in the environment of the coagulation fluid 106.

Thus, processes involved in the manufacturing method described by reference to FIG. 1 may include that the lyocell spinning solution 104, which may also be denoted as cellulose solution is shaped to form liquid strands or latent filaments, which are drawn by the gas flow 146 and significantly decreased in diameter and increased in length. Partial coagulation of latent filaments or fibers 108 (or preforms thereof) by coagulation fluid 106 prior to or during web formation on the fiber support unit 132 may also be involved. The filaments or fibers 108 are formed into web like fabric 102, washed, dried and may be further processed (see further processing unit 134), as required. The filaments or fibers 108 may for instance be collected, for example on a rotating drum or belt, whereby a web is formed.

As a result of the described manufacturing process and in particular the choice of solvent used, the fibers 108 have a copper content of less than 5 ppm and have a nickel content of less than 2 ppm. This advantageously improves purity of the fabric 102.

The lyocell solution blown web (i.e. the nonwoven cellulose fiber fabric 102) according to exemplary embodiments of the invention preferably exhibits one or more of the following properties:
(i) The dry weight of the web is from 5 to 300 g/m$^2$, preferably 10-80 g/m$^2$
(ii) The thickness of the web according to the standard WSP120.6 respectively DIN29073 (in particular in the latest version as in force at the priority date of the present patent application) is from 0.05 to 10.0 mm, preferably 0.1 to 2.5 mm
(iii) The specific tenacity of the web in MD according to EN29073-3, respectively ISO9073-3 (in particular in the latest version as in force at the priority date of the present patent application) ranges from 0.1 to 3.0 Nm$^2$/g, preferably from 0.4 to 2.3 Nm$^2$/g
(iv) The average elongation of the web according to EN29073-3, respectively ISO9073-3 (in particular in the latest version as in force at the priority date of the present patent application) ranges from 0.5 to 100%, preferably from 4 to 50%.
(v) The MD/CD tenacity ratio of the web is from 1 to 12
(vi) The water retention of the web according to DIN 53814 (in particular in the latest version as in force at the priority date of the present patent application) is from 1 to 250%, preferably 30 to 150%
(vii) The water holding capacity of the web according to DIN 53923 (in particular in the latest version as in force at the priority date of the present patent application) ranges from 90 to 2000%, preferably 400 to 1100%.
(viii) Metal residue levels of copper content of less than 5 ppm and nickel content of less than 2 ppm, according to the standards EN 15587-2 for the substrate decomposition and EN 17294-2 for the ICP-MS analysis (in particular in the latest version as in force at the priority date of the present patent application)

Most preferably, the lyocell solution-blown web exhibits all of said properties (i) to (viii) mentioned above.

As described, the process to produce the nonwoven cellulose fiber fabric 102 preferably comprises:
(a) Extruding a solution comprising cellulose dissolved in NMMO (see reference numeral 104) through the orifices 126 of at least one jet 122, thereby forming filaments of lyocell spinning solution 104
(b) Stretching said filaments of lyocell spinning solution 104 by a gaseous stream (see reference numeral 146)
(c) Contacting said filaments with a vapor mist (see reference numeral 106), preferably containing water, thereby at least partly precipitating said fibers 108. Consequently, the filaments or fibers 108 are at least partly precipitated before forming web or nonwoven cellulose fiber fabric 102.
(d) Collecting and precipitating said filaments or fibers 108 in order to form a web or nonwoven cellulose fiber fabric 102
(e) Removing solvent in wash line (see washing unit 180)
(f) Optionally bonding via hydro-entanglement, needle punching, etc. (see further processing unit 134)
(g) Drying and roll collection Constituents of the nonwoven cellulose fiber fabric 102 may be bonded by merging, intermingling, hydrogen bonding, physical bonding such as hydroentanglement or needle punching, and/or chemical bonding.

In order to be further processed, the nonwoven cellulose fiber fabric 102 may be combined with one or more layers of the same and/or other materials, such as (not shown) layers of synthetic polymers, cellulosic fluff pulp, nonwoven webs of cellulose or synthetic polymer fibers, bicomponent fibers, webs of cellulose pulp, such as airlaid or wetlaid pulp, webs or fabrics of high tenacity fibers, hydrophobic materials, high performance fibers (such as temperature resistant materials or flame retardant materials), layers imparting changed mechanical properties to the final products (such as Polypropylene or Polyester layers), biodegradable materials (e.g. films, fibers or webs from Polylactic acid), and/or high bulk materials.

Figure 7:
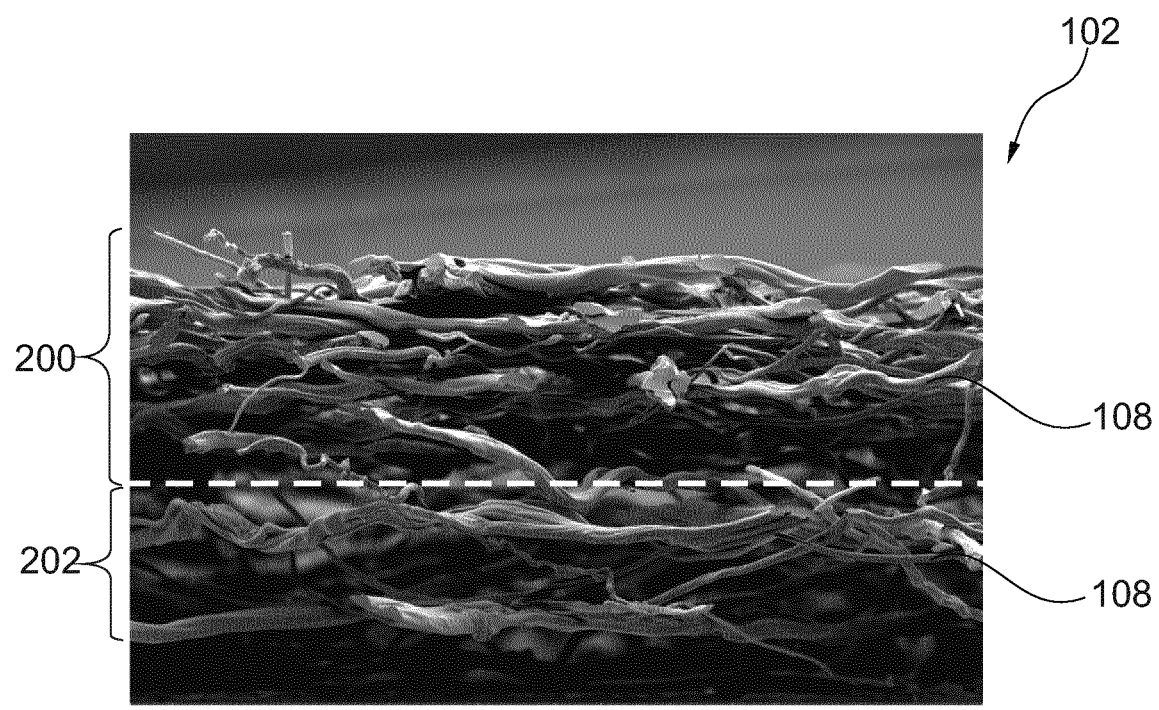
FIG. 7 shows an experimentally captured image of nonwoven cellulose fiber fabric according to an exemplary embodiment of the invention in which formation of two superposed layers of fibers has been accomplished by a specific process implementing two serial bars of nozzles.

It is also possible to combine several distinguishable layers of nonwoven cellulose fiber fabric 102, see for instance FIG. 7.

The nonwoven cellulose fiber fabric 102 may essentially consist of cellulose alone. Alternatively, the nonwoven cellulose fiber fabric 102 may comprise a mixture of cellulose and one or more other fiber materials. The nonwoven cellulose fiber fabric 102, furthermore, may comprise a bicomponent fiber material. The fiber material in the nonwoven cellulose fiber fabric 102 may at least partly comprise a modifying substance. The modifying substance may be selected from, for example, the group consisting of a polymeric resin, an inorganic resin, inorganic pigments, antibacterial products, nanoparticles, lotions, fire-retardant products, absorbency-improving additives, such as superabsorbent resins, ion-exchange resins, carbon compounds such as active carbon, graphite, carbon for electrical conductivity, X-ray contrast substances, luminescent pigments, and dye stuffs.

Concluding, the cellulose nonwoven web or nonwoven cellulose fiber fabric 102 manufactured directly from the lyocell spinning solution 104 allows access to value added web performance which is not possible via staple fiber route. This includes the possibility to form uniform lightweight webs, to manufacture microfiber products, and to manufacture continuous filaments or fibers 108 forming a web. Moreover, compared to webs from staple fibers, several manufacturing procedures are no longer required. Moreover, nonwoven cellulose fiber fabric 102 according to exemplary embodiments of the invention is biodegradable and manufactured from sustainably sourced raw material (i.e. wood pulp 110 or the like). Furthermore, it has advantages in terms of purity and absorbency. Beyond this, it has an adjustable mechanical strength, stiffness and softness. Furthermore, nonwoven cellulose fiber fabric 102 according to exemplary embodiments of the invention may be manufactured with low weight per area (for instance 10 to 30 $g/m^2$). Very fine filaments down to a diameter of not more than 5 µm, in particular not more than 3 µm, can be manufactured with this technology. Furthermore, nonwoven cellulose fiber fabric 102 according to an exemplary embodiment of the invention may be formed with a wide range of web aesthetics, for instance in a flat crispy film-like way, in a paper-like way, or in a soft flexible textile-like way. By adapting the process parameters of the described process, it is furthermore possible to precisely adjust stiffness and mechanical rigidity or flexibility and softness of the nonwoven cellulose fiber fabric 102. This can be adjusted for instance by adjusting a number of merging positions, the number of layers, or by after-treatment (such as needle punch, hydro-entanglement and/or calendering). It is in particular possible to manufacture the nonwoven cellulose fiber fabric 102 with a relatively low basis weight of down to 10 $g/m^2$ or lower, to obtain filaments or fibers 108 with a very small diameter (for instance of down to 3 to 5 µm, or less), etc.

Figure 2:
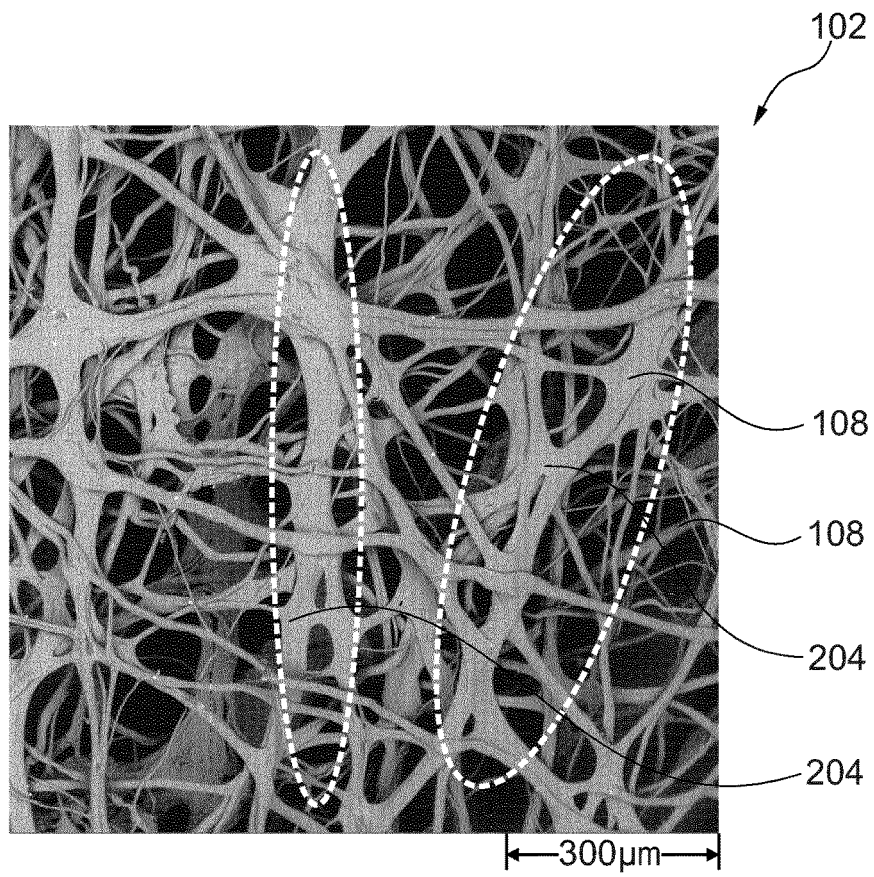
FIG. 2 shows an experimentally captured image of nonwoven cellulose fiber fabric according to an exemplary embodiment of the invention in which merging of individual fibers has been accomplished by a specific process control.
Figure 3:
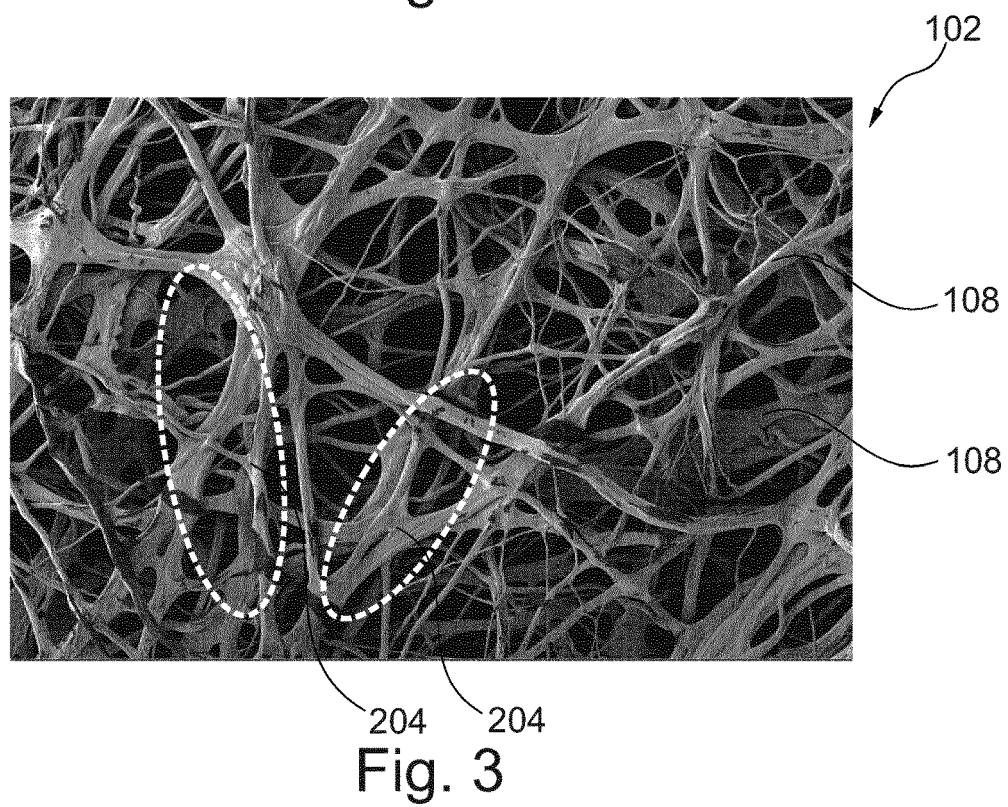
FIG. 3 shows an experimentally captured image of nonwoven cellulose fiber fabric according to an exemplary embodiment of the invention in which merging of individual fibers has been accomplished by a specific process control.
Figure 4:
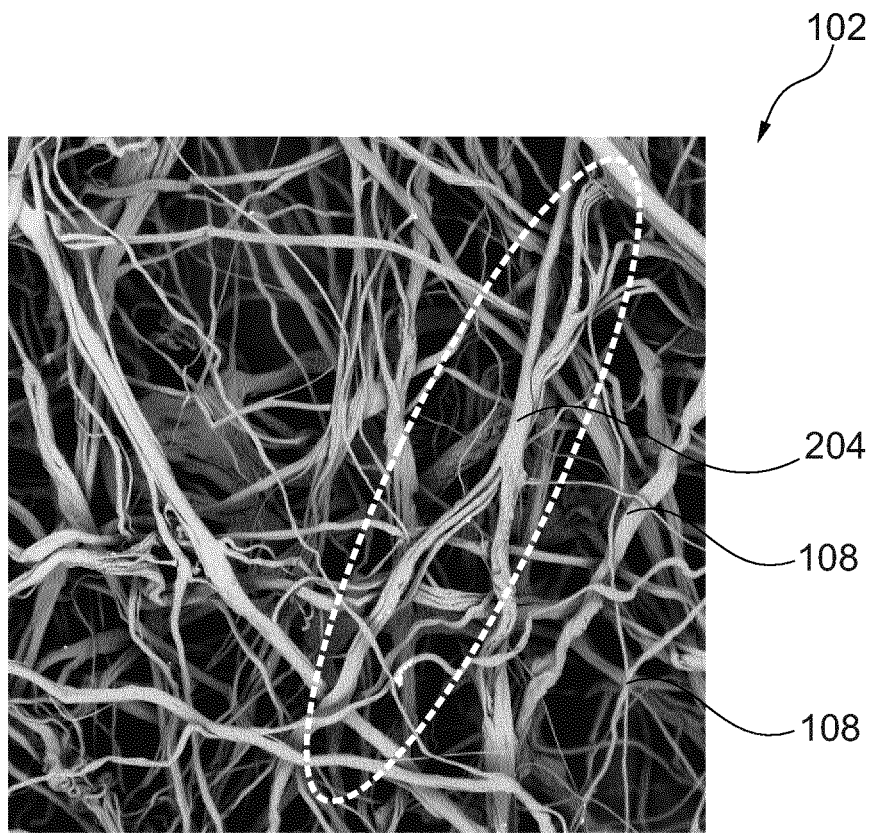
FIG. 4 shows an experimentally captured image of nonwoven cellulose fiber fabric according to an exemplary embodiment of the invention in which merging of individual fibers has been accomplished by a specific process control.

FIG. 2, FIG. 3 and FIG. 4 show experimentally captured images of nonwoven cellulose fiber fabric 102 according to an exemplary embodiment of the invention in which merging of individual fibers 108 has been accomplished by a corresponding process control. The oval markers in FIG. 2 to FIG. 4 show such merging regions where multiple fibers 108 are integrally connected to one another. At such merging points, two or more fibers 108 may be interconnected to form an integral structure.

Figure 5:
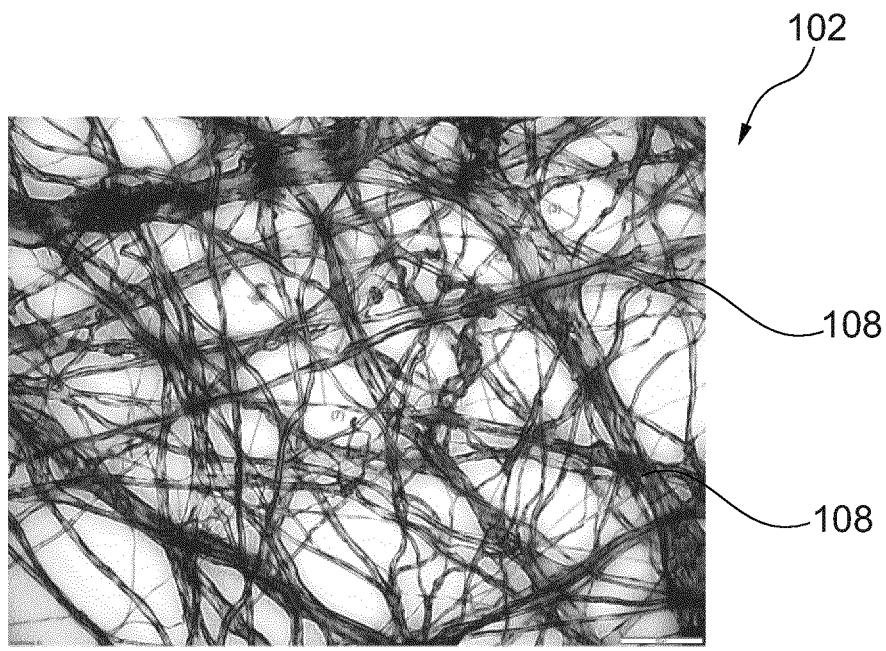
FIG. 5 shows an experimentally captured image of nonwoven cellulose fiber fabric according to an exemplary embodiment of the invention in which swelling of fibers has been accomplished, wherein the fiber fabric is shown in a dry non-swollen state.
Figure 6:
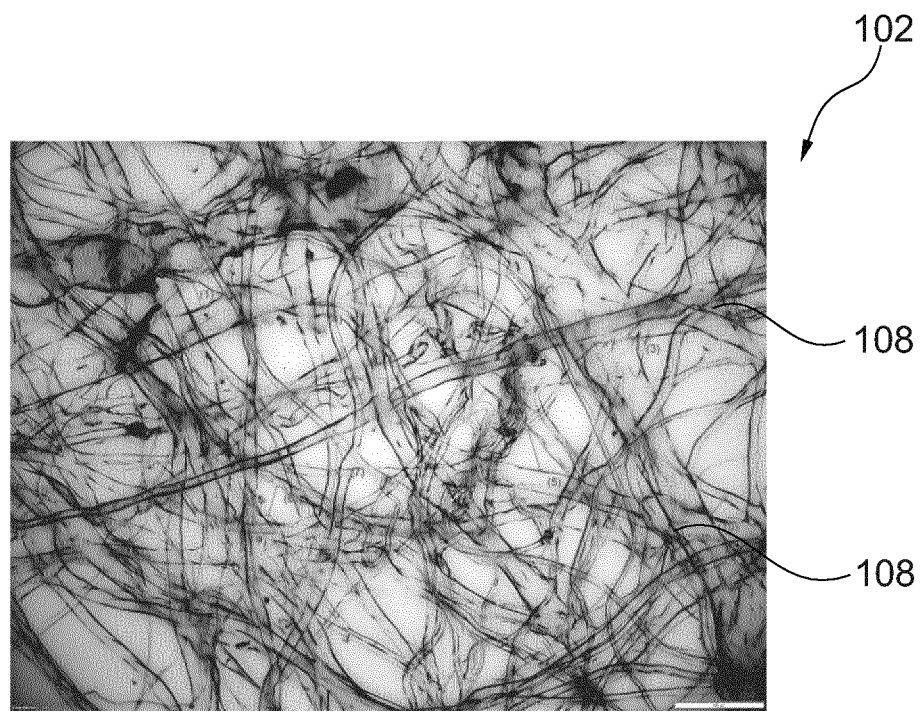
FIG. 6 shows an experimentally captured image of nonwoven cellulose fiber fabric according to an exemplary embodiment of the invention in which swelling of fibers has been accomplished, wherein the fiber fabric is shown in a humid swollen state.

FIG. 5 and FIG. 6 show experimentally captured images of nonwoven cellulose fiber fabric 102 according to an exemplary embodiment of the invention in which swelling of fibers 108 has been accomplished, wherein FIG. 5 shows the fiber fabric 102 in a dry non-swollen state and FIG. 6 shows the fiber fabric 102 in a humid swollen state. The pore diameters can be measured in both states of FIG. 5 and FIG. 6 and can be compared to one another. When calculating an average value of 30 measurements, a decrease of the pore size by swelling of the fibers 108 in an aqueous medium up to 47% of their initial diameter could be determined.

FIG. 7 shows an experimentally captured image of nonwoven cellulose fiber fabric 102 according to an exemplary embodiment of the invention in which formation of two superposed layers 200, 202 of fibers 108 has been accomplished by a corresponding process design, i.e. a serial arrangement of multiple spinnerets. The two separate, but connected layers 200, 202 are indicated by a horizontal line in FIG. 7. For instance, an n-layer fabric 102 (n≥2) can be manufactured by serially arranging n spinnerets or jets 122 along the machine direction.

Figure 8:
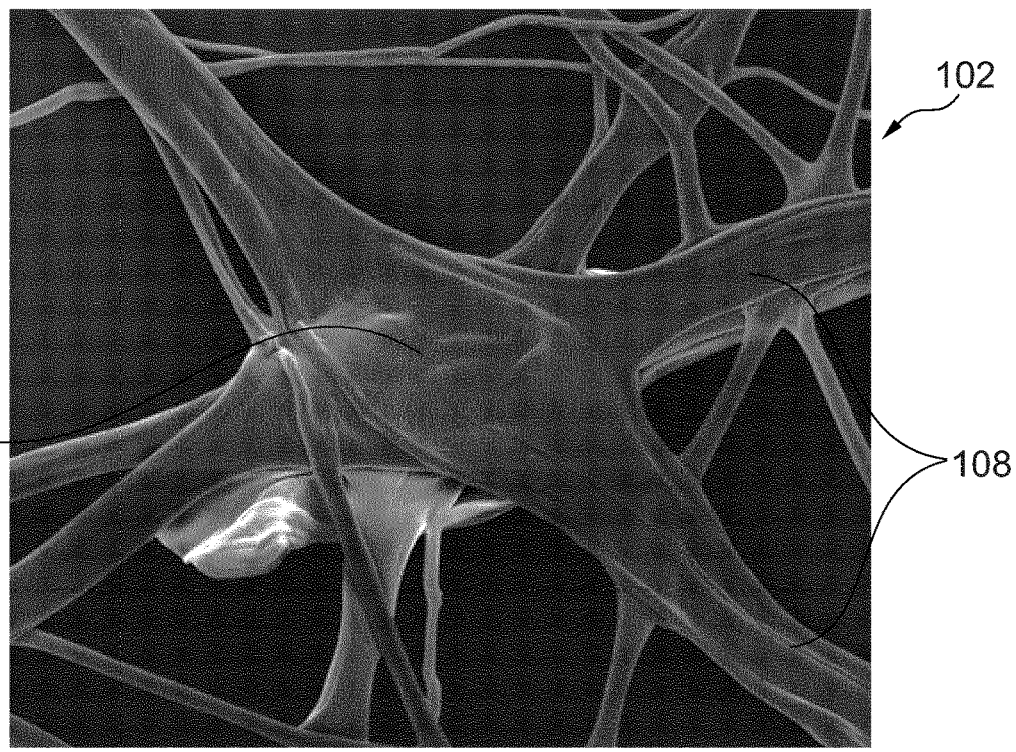
FIG. 8 shows an experimentally captured image of nonwoven cellulose fiber fabric according to an exemplary embodiment of the invention in which formation of a pad-like areal merging position between fibers has been accomplished by a corresponding process control.

Specific exemplary embodiments of the invention will be described in the following in more detail:

FIG. 8 shows an experimentally captured image of nonwoven cellulose fiber fabric 102 according to an exemplary embodiment of the invention in which formation of a pad-like areal merging position 204 between fibers 108 has been accomplished by a corresponding process control.

The image according to FIG. 8 shows part of a nonwoven cellulose fiber fabric 102 according to an exemplary embodiment of the invention being directly manufactured from lyocell spinning solution 104. The fabric 102 comprises a network of substantially endless fibers 108. Some of the fibers 108 are integrally merged with one another at merging positions 204 in a spatially homogeneous way, i.e. with a substantially uniform density of merging positions 204 per area of the fabric. The merging positions 204 linking the various fibers 108 substantially consist of the same material as each of the merged fibers 108 itself, i.e. cellulose.

Hence, merging positions 204 of fabric 100 according to exemplary embodiments of the invention may have very different shapes and characteristics. According to FIG. 3, FIG. 4 and FIG. 8, the merging positions 204 comprise a merging point at which fibers 108 are merged substantially with a point contact. According to FIG. 5, the merging positions 204 comprise an oblong merging line along which fibers 108 are mutually aligned side-by-side or parallel to one another over a portion of their length to form a superordinate fiber structure.

Figure 9:
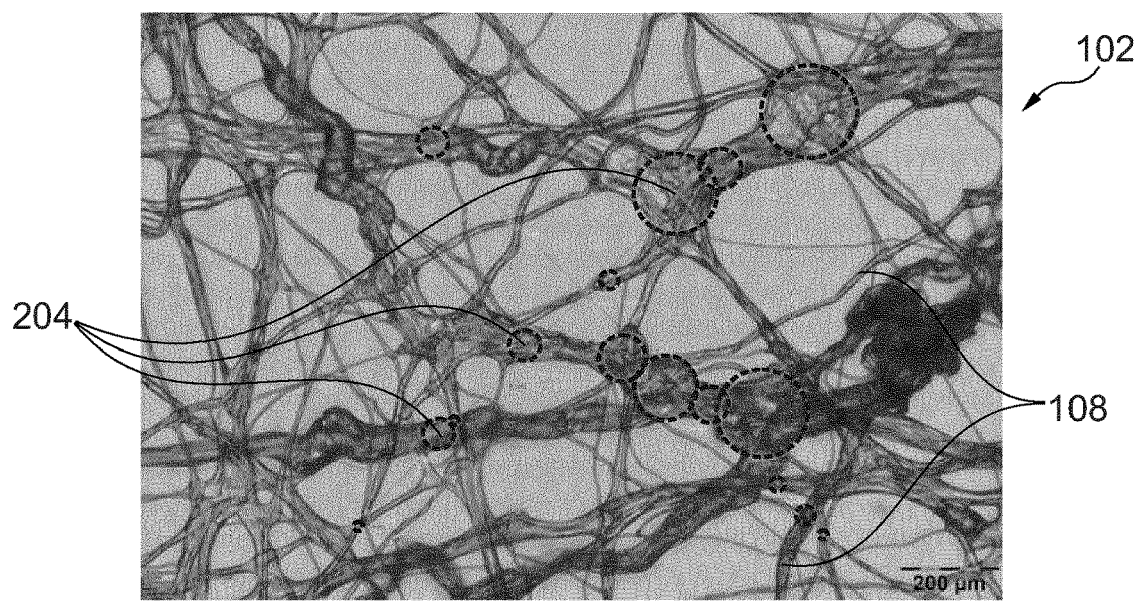
FIG. 9 shows an experimentally captured image of nonwoven cellulose fiber fabric according to an exemplary embodiment of the invention illustrating determination of a merging factor.

FIG. 9 shows an experimentally captured image of nonwoven cellulose fiber fabric 102 according to an exemplary embodiment of the invention illustrating determination of a merging factor. The merging factor is a quantitative measure for the degree of inter-fiber merging between fibers 108 of the fabric 102. Various small circles in FIG. 9 indicate merging positions 204 where respective fibers 108 of the fabric 100 are merged.

Counting and quantifying the number of merging positions 204 in the image shown in FIG. 9 allows to determine the merging factor. More specifically, the merging factor can be determined as described referring to FIG. 12.

Typically, a merging factor of the fibers 108 of fabric 102 according to an exemplary embodiment of the invention may be in a range between 0.1% (i.e. sufficiently strong and highly elastic coupling of the fibers 108) and 100% (i.e. an extremely strong coupling between the fibers 108 with some remaining elasticity so that the resulting fabric 102 is a continuous sheet or film).

Since formation of merging positions 204 is accomplished in a self-sufficient way during manufacturing the fabric 102 by a mere adjustment of the process parameters (i.e. without the need to add additives), the fibers 108 have a copper content of less than 5 ppm and have a nickel content of less than 2 ppm. The described manufacturing method may hence also ensure that no heavy metal element contributes with more than 10 ppm to contamination of the fabric 102 with metal impurities. This can be achieved by forming the merging positions 204 by bringing into contact different strands or filaments of lyocell spinning solution 104 before coagulation to solid fibers 108 and without the supplement of other bonding agents such as adhesive glue.

Figure 10:
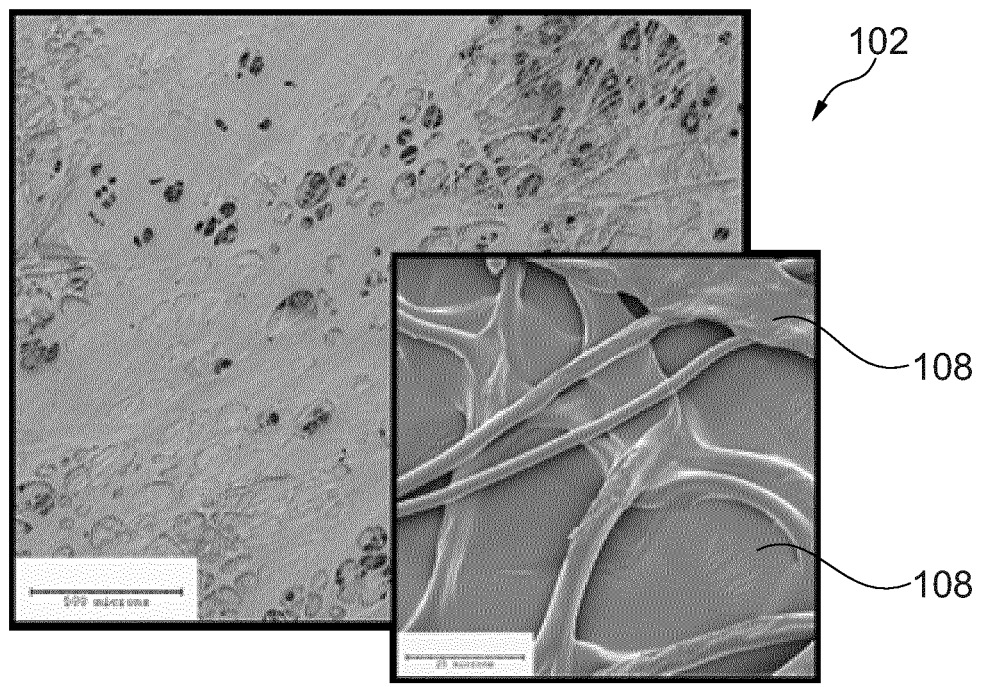
FIG. 10 shows an experimentally captured image of nonwoven cellulose fiber fabric according to an exemplary embodiment of the invention in which a merging factor of almost hundred percent has been adjusted by process control.

FIG. 10 shows an experimentally captured image of nonwoven cellulose fiber fabric 102 according to an exemplary embodiment of the invention. In the illustrated embodiment, a merging factor of almost one (more precisely: about 98%) has been adjusted by process control. As a result of the extremely high merging factor, the fabric 102 shown in FIG. 10 is a substantially continuous sheet having a similar consistency as a sheet of paper. Such a fabric 102 has a flat crispy film like behavior. As can be taken from FIG. 10, the process parameters may be adjusted for adjusting merging so as to trigger formation of such an amount of merging positions 204 that a substantially continuous film-shaped fabric 102 is obtained.

Figure 11:
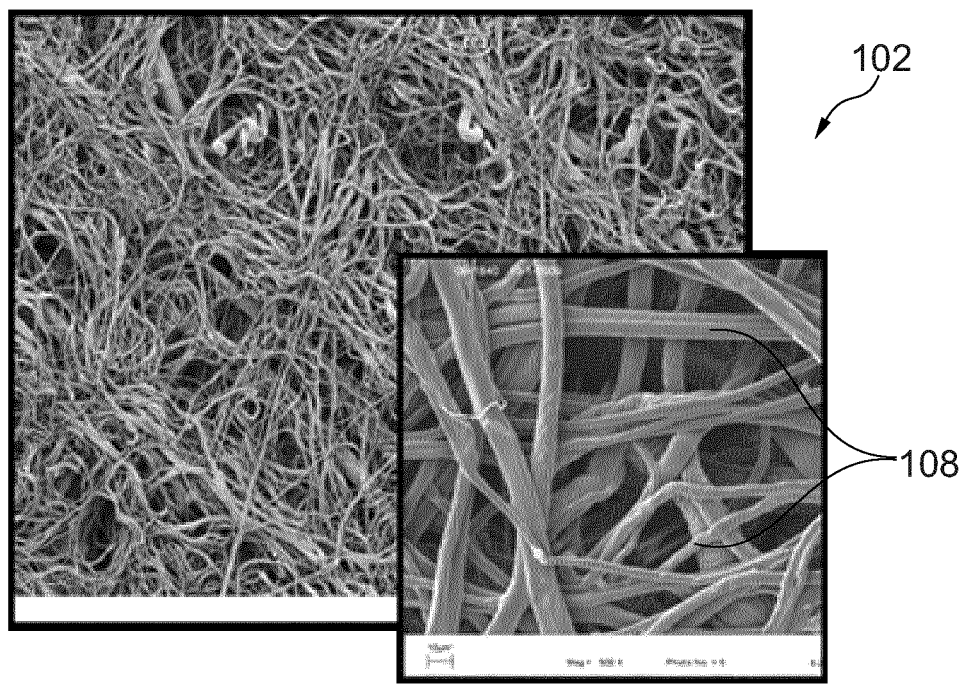
FIG. 11 shows an experimentally captured image of nonwoven cellulose fiber fabric in which a merging factor of almost zero percent has been adjusted by process control.

FIG. 11 shows an experimentally captured image of nonwoven cellulose fiber fabric 102, a merging factor of almost zero (more precisely: slightly below 2%) has been adjusted by process control. Such a fabric 102 has a soft flexible textile like behavior. As a result of the very small merging factor, the fabric 102 shown in FIG. 11 is a network of fibers 108 being only weakly linked via few merging positions 204. Over the majority of the fabric 100 however, the fibers 108 are only friction-coupled with one another rather than being coupled by merging. The result is a relatively flexible fabric 102 being nevertheless suitably held together by the merging positions 204. With an adjustable increase of the merging positions 204 over the structure shown in FIG. 11, a fabric 102 according to another exemplary embodiment of the invention can be manufactured.

Figure 12:
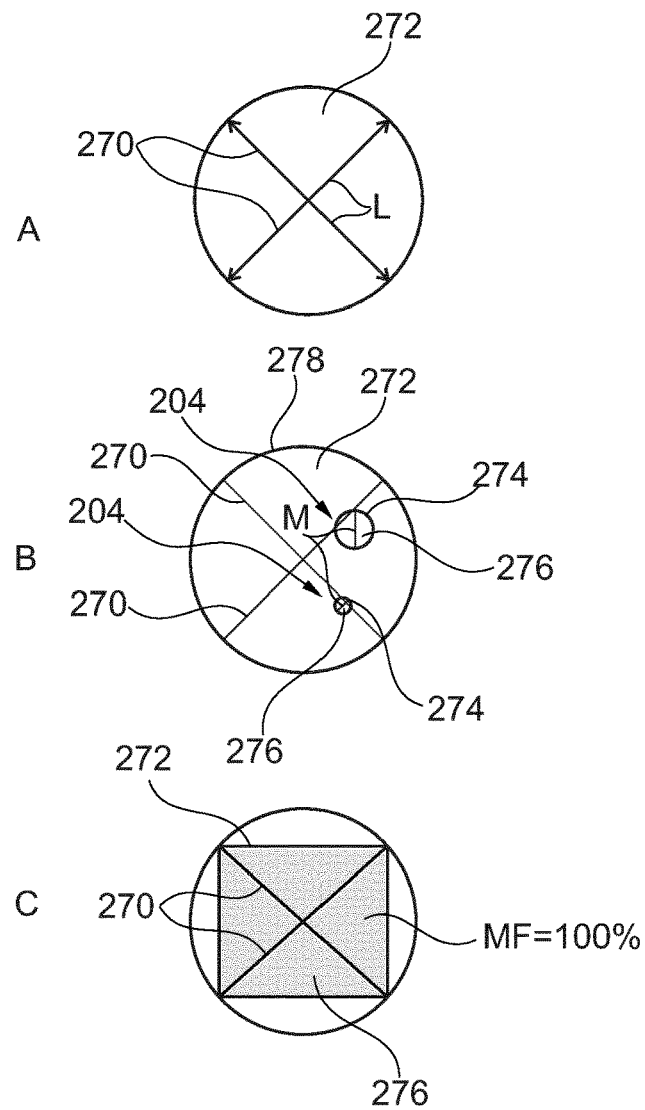
FIG. 12A shows a schematic image illustrating definition and determination of the merging factor of fabric.
FIG. 12B shows a schematic image illustrating definition and determination of the merging factor of fabric.
FIG. 12C shows a schematic image illustrating definition and determination of the merging factor of fabric.

FIG. 12 shows a schematic image illustrating definition and determination of the area merging factor MF (compare description above referring to FIG. 9).

For the fabric 102 under analysis, three specimens (for instance having an area of 1×1 cm$^2$) are taken to determine the merging factor MF via light microscope analysis by applying the measuring and calculation procedure which will be described in the following.

A measuring window used under light microscope for each specimen is a 1 mm$^2$ square 272 with diagonals 270 (see FIG. 12, illustration A, which shows that square 272 defines the measuring window). All merged filaments or fibers 108 crossing one or both of diagonals 270 of the square 272 are measured by putting a respective circle 274 around the merging area 276 (i.e. the area corresponding to merging point, merging pad or merging line) of the merged fibers 108 crossing the diagonal 270 (see FIG. 12, illustration B, and the circles in FIG. 9). For instance, the diameter M of a respective circle 274 may be determined with a least squares fit between circle 274 and merging area 276. The diameters, M, of the circles 274 (but not the entire circular area) used for measuring MF of the filaments or fibers 108 always have to stay inside the measuring window of the square 272 (see largest circle with diameter L indicated with reference numeral 278). The circle diameter M of all merged filaments or fibers 108 crossing the diagonals 270 (over threefold determination) is averaged. The value of the average, AM, is then recalculated as a percentage of one diagonal length, L, of the square 272.

Thus, the merging factor MF is calculated in percent according to the following formula:

$$MF[\%] = AM/L * 100\%$$

AM is the average of the merge diameters of the circles 274 of the merged fibers 108 (in particular over threefold). L is the length of one diagonal 270 through the square 272.

For instance, if all measuring windows over threefold are filled with a continuous film, the average circle diameter AM of the merged filaments or fibers 108 equals the length L of the diagonal 270 of a respective square 272, which gives a merging factor MF of 100% (see FIG. 12, illustration C). In other words, a film means AM=L and consequently MF=100%. Each value of the merging factor MF below 100% means that the fabric 102 is not present at a continuous film.

Thus, for determining area merging factor MF of fabric 102, the following determination process may be carried out: Square samples (see reference numeral 270) of the fabric 102 may be optically analyzed. A respective circle 274, which has to stay fully inside the square sample 272, is drawn around each merging position 204 (in particular merging point, merging pad and/or merging line) of fibers 108 crossing at least one of the diagonals 270 of the square sample. An arithmetic average AM of the values of the diameter M of the determined circles 274 is calculated. The merging factor MF is calculated as ratio between the averaged diameter value AM and the diagonal length L of the square sample, and may be given in percent.

According to an exemplary embodiment of the invention, it is advantageous that a nonwoven cellulose fiber fabric 102 according to an exemplary embodiment of the invention and as shown in the above described figures has fibers 108 which are spatially homogeneously merged substantially over the entire fabric 102. The degree of homogeneity is so that the merging factor, as defined referring to FIG. 12, of the fibers 108 shall differ over substantially the entire fabric 102 (in particular shall differ for various different 1×1 cm$^2$ samples of one and the same fabric 102) preferably by an absolute value of not more than 10%. This prevents mechanical weak points as well as regions of pronounced stiffness of the fabric 102. The absolute value of the merging factor of the fibers 108 of each of the samples (in particular of each of the various different 1×1 cm$^2$ samples of one and the same fabric 102) may for instance be in a range between 0.1% and 100%. This ensures a homogenous mechanical properties of the fabric 102. In such a fabric 102, it is advantageous to adjust its physical properties (by an adjustment of the process parameters of the manufacturing procedure, compare the above described FIG. 1 as well as the below described FIG. 13 and FIG. 14) so as to obtain a higher mechanical stability for a given grammage of the fabric 102 or a reduced grammage at the same mechanical stability as a conventional fabric.

Figure 13:
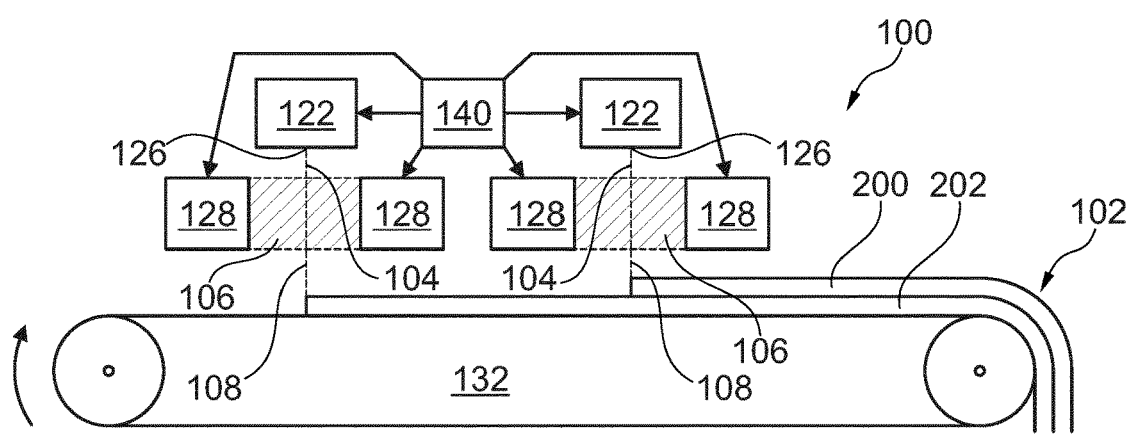
FIG. 13 illustrates a device for manufacturing nonwoven cellulose fiber fabric according to another exemplary embodiment of the invention in which the process is controlled so as to trigger homogeneous formation of merging positions between fibers.

In the following, referring to FIG. 13 and FIG. 14, it will be described in further detail how the process parameters of a method of manufacturing fabric 102 according to an exemplary embodiment of the invention can be adjusted so as to obtain a fabric 102 with the above-described merging homogeneity and related properties:

FIG. 13 illustrates a part of a device 100 for manufacturing nonwoven cellulose fiber fabric 102 composed of two stacked layers 200, 202 of endless cellulose fibers 108 according to an exemplary embodiment of the invention. A difference between the device 100 shown in FIG. 13 and the device 100 shown in FIG. 1 is that the device 100 according to FIG. 13 comprises two serially aligned jets 122 and respectively assigned coagulation units 128, as described above. In view of the movable fiber accommodation surface of the conveyor belt-type fiber support unit 132, the upstream jet 122 on the left-hand side of FIG. 13 produces layer 202 of fibers 108. Layer 200 of other fibers 108 is produced by the downstream jet 122 (see right hand side of FIG. 13) and is attached to an upper main surface of the previously formed layer 202 so that a double layer 200, 202 of fabric 102 is obtained.

According to FIG. 13, the control unit 140 (controlling the jets 122 and the coagulation units 128) is configured for adjusting process parameters so that at least part of the fibers 108 are integrally merged at merging positions 204 between layers 200, 202.

Although not shown in FIG. 13, it is possible to further process the fibers 108 after collection on the fiber support unit 132, for instance by hydroentanglement, needling, and/or impregnating.

Still referring to the embodiment illustrated in FIG. 13, one or more further nozzle bars or jets 122 may be provided and may be arranged serially along a transport direction of fiber support unit 132. The multiple jets 122 may be arranged so that further layer 200 of fibers 108 may be deposited on top of the previously formed layer 202, preferably before the coagulation or curing process of the fibers 108 of the layer 202 and/or of the layer 200 is fully completed, which may trigger merging. When properly adjusting the process parameters, this may have advantageous effects in terms of the properties of a multilayer fabric 102:

Intended merging between fibers 108 of the fabric 102 according to FIG. 13 can be triggered so as to further increase the mechanical stability of the fabric 102 while simultaneously obtaining some elasticity. At the same time, the merging positions 204 per area of the sheet-like fabric 102 may be homogenously distributed over the extension of the fabric 102 so as to obtain spatially uniform properties in terms of robustness and flexibility. In this context, merging may be denoted as a supported contact point adhesion of contacting filaments of fibers 108, in particular prior to the completion of a coagulation process of one or both of the fibers 108 being merged.

The device 100 according to FIG. 13, which is configured for the manufacture of multilayer fabric 102, implements a high number of process parameters which can be used for adjusting merging factor, designing shape and/or diameter or diameter distribution of the fibers 108 as well as of fiber layers 200, 202. This is the result of the serial arrangement of multiple jets 122, each of which being operable with individually adjustable process parameters.

With device 100 according to FIG. 13, it is in particular possible to manufacture a fabric 102 composed of at least two layers 200, 202 (preferably more than two layers). According to exemplary embodiments of the invention, both intra-layer adhesion of the fibers 108 of one layer 200, 202 as well as inter-layer adhesion of the fibers 108 between adjacent layers 200, 202 (for instance by merging and/or by friction generating contact) may be properly and individually adjusted, preferably to be the same. A corresponding separate control for each layer 200, 202 individually may be in particular obtained when the process parameters are adjusted so that coagulation or curing of the fibers 108 of one layer 202 is already completed when the other layer 200 of fibers 108 is placed on top thereof.

For instance, adjusting the process parameters for adjusting merging according to FIG. 13 comprises serially arranging multiple jets 122 with orifices 126 along a movable fiber support unit 132, depositing first layer 202 of fibers 108 on the fiber support unit 132, and depositing second layer 200 of fibers 108 on the first layer 202 before coagulation of some or all of the fibers 108 at an interface between the layers 200, 202 has been completed. Thus, different ones of the fibers 108 of the fabric 102 may be located in different distinguishable layers 200, 202 which can however be merged by forming merging positions 204. In other words, fibers 108 of different layers 200, 202 may be integrally merged at one or more merging position 204 between the layers 200, 202.

Figure 14:
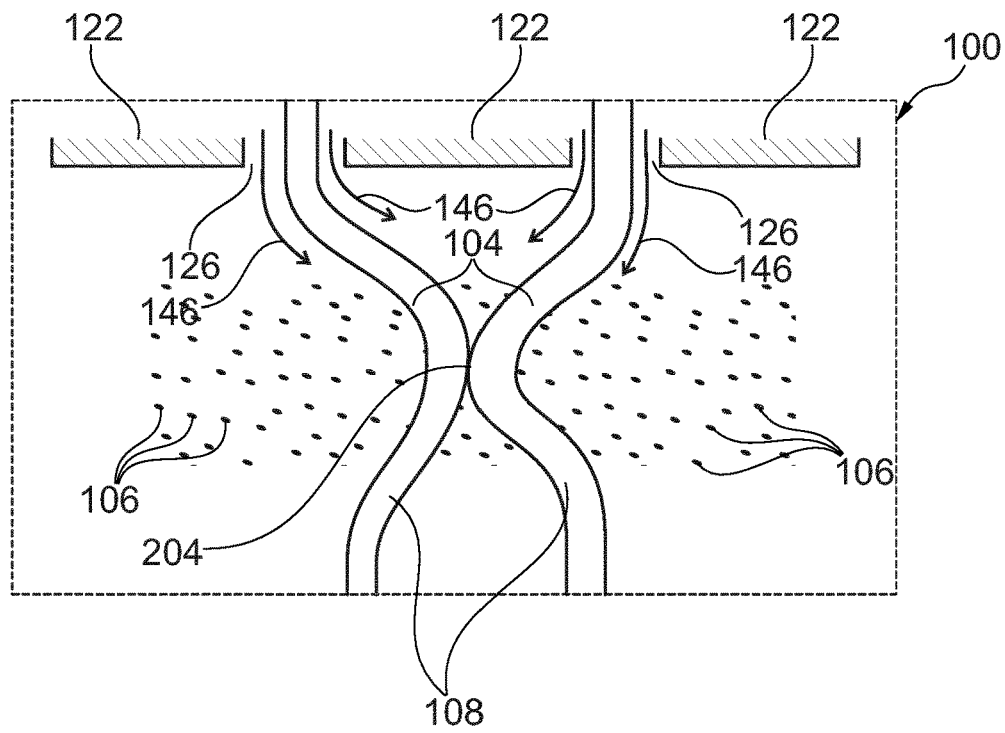
FIG. 14 illustrates a part of a device for manufacturing nonwoven cellulose fiber fabric according to yet another exemplary embodiment of the invention in which the process is controlled so as to trigger formation of merging positions between fibers by exerting a lateral force to the fibers during coagulation.

FIG. 14 illustrates a part of a device 100 for manufacturing nonwoven cellulose fiber fabric 102 according to yet another exemplary embodiment of the invention in which the process is controlled so as to trigger formation of merging positions 204 between fibers 108 by exerting a lateral force to the fibers 108 during coagulation and hence prior to completion of coagulation.

According to FIG. 14, the process parameters may be adjusted for adjusting merging by forming the merging positions 204 after the lyocell spinning solution 104 has left the orifices 126 of the jet 122 and before the lyocell spinning solution 104 has reached the fiber accommodation surface on an upper side of the fiber support unit 132. In the shown embodiment, a process of merging may be initiated by triggering an interaction or a physical contact between different neighbored strands of lyocell spinning solution 104 extruded through different ones of the orifices 126 before precipitation is finished. As can be taken from the schematic illustration in FIG. 14, the gas flow 146 around the strands or filaments of lyocell spinning solution 104 may be adjusted so as to exert also a lateral force on these strands or filaments before coagulation. This means that according to FIG. 14 the gas flow 146 is not oriented purely vertically, but also has a force vector in the horizontal direction. Such a gas flow 146 can be created by blowing air or another gas also along a horizontal direction of FIG. 14. Additionally or alternatively, such a horizontal force component can be generated by blowing the air or other gas of the gas flow 146 with such a velocity that the gas flow operates at least partly in the turbulent regime. Resulting vorticity may then also trigger a physical contact between the filaments of lyocell spinning solution 104 before coagulation, i.e. before being transferred from the solution phase into a precipitated solid fiber phase. Formation of merging positions 204 may therefore be carried out by bringing filaments of lyocell spinning solution 104 in direct physical contact with one another before coagulation has been completed and maintaining the direct physical contact until coagulation has been completed.

Figure 15:
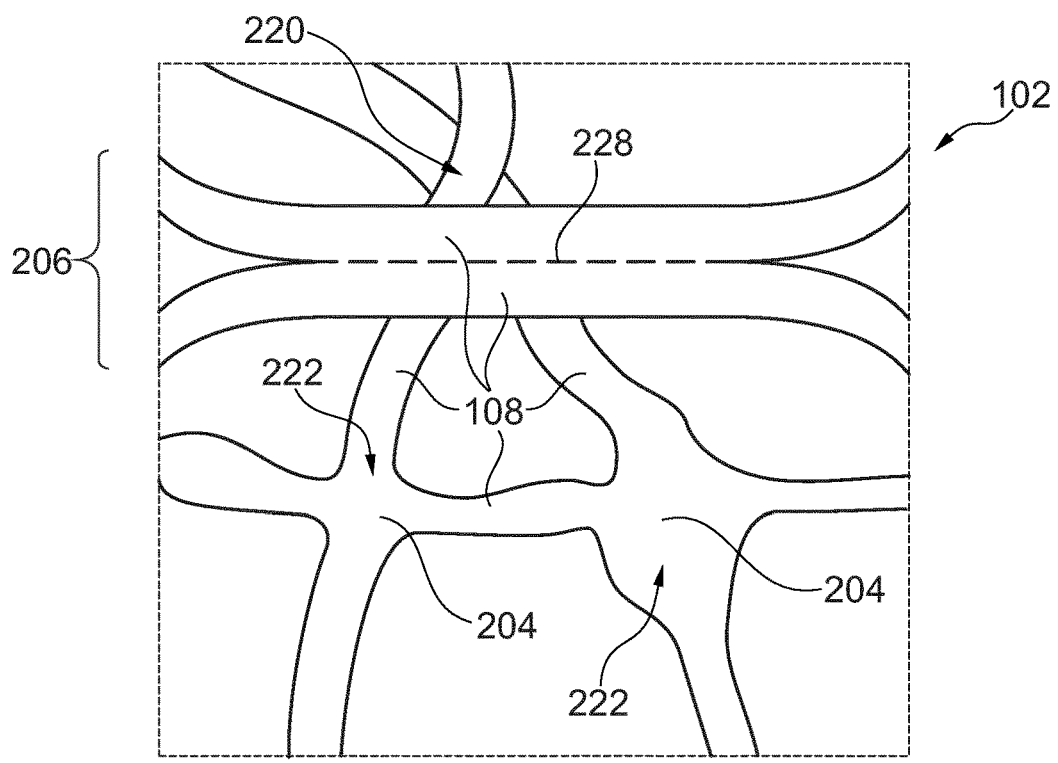
FIG. 15 shows a schematic image of nonwoven cellulose fiber fabric according to an exemplary embodiment of the invention in which different types of merging positions between fibers as well as crossing positions between fibers are shown.

FIG. 15 shows a schematic image of nonwoven cellulose fiber fabric 102 according to an exemplary embodiment of the invention in which on the one hand different types of merging positions 204 between fibers 108 and on the other hand non-merged crossing positions 220 between fibers 108 are shown.

The merging positions 204 comprise a merging point (see reference numeral 222) at which fibers 108 are merged with a point contact without significant increase of the diameter at the merging point. The merging positions 204 also comprise a merging line 228 along which fibers 108 are mutually aligned side-by-side over a portion of their length to form a superordinate fiber structure 206 with a diameter increase along the entire merging line. While the fibers 108 are integrally connected at the merging positions 204 and can be separated here only by destroying the fiber network, fibers 108 are only in frictional contact with one another at crossing positions 220 and can be freely moved here relatively to one another. Although merging and crossing between respectively two fibers 108 is illustrated in FIG. 15, merging and/or crossing can also occur between respectively at least three fibers 108.

Generally, the mechanical stability of a nonwoven cellulose fiber fabric 102 may be adjusted by homogenizing merging properties of the fabric. This allows a specific functionalization of a product by adjusting merging properties. More specifically, control of a homogeneous, in particular also an isotropic, merging of solution blown cellulose fibers 108 prior to the completion of the coagulation process of the individual fibers 108 may be carried out. According to an exemplary embodiment, merging may be accomplished without increasing a contamination of the fabric 102 with heavy metal, and in particular without the addition of a further separate interface material for accomplishing merging. Merging control according to an exemplary embodiment of the invention may allow to obtain a highly robust fabric 102. Merging homogenization may be accomplished by controlling the interaction between different filaments of lyocell spinning solution 104 prior to coagulation for forming an interconnected web. Descriptively speaking, arbitrary or random processes on a microscopic level may be cumulated on a macroscopic scale to thereby enhance mechanical stability. Higher stability at the same grammage or reduced grammage at the same stability may be obtained. Functionalization of the fabric 102 or individual portions of the fabric 102 (for instance individual layers 200, 202 thereof) can be carried out despite of the homogeneous merging properties of the entire fabric 102.

Homogeneous formation of fiber to fiber connecting merging positions 204 may on the one hand be promoted by a turbulent gas flow 246 around strands of lyocell spinning solution 104 during its longitudinal stretching procedure, i.e. prior to completion of coagulation. On the other hand, such fiber to fiber merging positions may also be generated when the strands of lyocell spinning solution 104 are laid on a fiber accommodation surface of a fiber support unit 132 if this occurs prior to completion of coagulation. The resulting self-sufficient adhesion between fibers 108 can be denoted as merging.

Such merging can occur at different times during curing of the fibers 108, and varying intensities and can be adjusted using different media in different physical condition (such as water, air, etc.). By such a control operation, coagulation and shape change of the filaments can be controlled, and on the other hand also the adhesion force at the mentioned contact positions or merging positions 204 can be adjusted. As a result, very different merging effects can be adjusted in a however spatially uniform way, which translates into very different adjustable homogeneous properties of the readily manufactured fabric 102.

In the context of the mentioned laydown, statistic processes occur during formation of the fabric 102. These result in an arbitrary or random structure of the endless fibers 108. As a result of such processes, zones with uniform fiber distribution and anisotropic fiber distribution (which can be denoted as "holes" for the following explanation) are formed. There is experimental evidence that the stability (at a given fiber quantity) depends significantly on basis weight, amount of layers, merging factor and homogeneity of the merging. Stability can be analyzed for a given basis weight, or a given stability may be analyzed in terms of a varying basis weight. As a result, merging factor and merging homogeneity remain as freely adjustable control parameters. Homogeneity can be controlled by process fluid (for instance air or water, see for instance gas flow 146), construction of the fiber accommodation structure on which the fibers 108 or preforms thereof lay down (i.e. design of the fiber support unit 132, which may for instance be a grid through which a fluid may be guided for shaping the fabric 102 under formation), etc. In one embodiment, merging homogeneity can be increased by the combination of multiple arbitrarily aligned structures of fibers 108. For example, this can be achieved by the serial arrangement of a plurality of nozzle bars or jets 122 in the manufacturing device 100 (compare FIG. 13). Descriptively speaking, if the probability of a "hole" of a given dimension (denoting a zone of an anisotropic laydown) is 10%, the probability of a "hole" of a double layer is already significantly lower (since this would require the presence of a "hole" at a corresponding position in both layers 200, 202). Since the two layers 200, 202 may be coagulated independently from another when arranging different jets 122 serially along a transport direction of the fabric 102, the probability of a remaining "hole" in both layers 200, 202 is further reduced (according to a square function, not only in accordance with a linear function). Thus, with a multilayer fabric 102 the probability of "holes" (i.e. inhomogeneities in terms of merging) can be strongly reduced as compared to a single layer fabric 102 of the same thickness as the multilayer fabric 102. Thus, an already advantageous homogeneous merging of fibers 108 of a single layer fabric 102 may be further significantly improved by overlaying multiple independently formed layers 200, 202 on top of each other.

Referring to the mechanical stability of the fabric 102 according to an exemplary embodiment of the invention, this stability also depends on the merging factor. However, it has also been found surprisingly that it is in particular the homogeneity of the merging which matters for the stability of the entire fabric 102: regions of the sheet-like fabric 102 with an excessively higher merging factor as compared to other regions within this sheet-like fabric 102 tend to locally lose elasticity. This, in turn, has the consequence that breakage of the first fiber 108 of fabric 102 may trigger tearing of the entire fabric 102 in an avalanche-like manner. The reason for this is that other regions within the extension plane of the fabric 102 having a smaller merging factor (as compared to the before mentioned region) may result in a locally weak fiber compound. Thus, the latter mentioned regions cannot transfer impacting load forces to other regions of the fabric 102. The latter force equilibration is further inhibited by the first mentioned excessively low-elastic regions of the fabric 102. Thus, it is particularly an inhomogeneous merging which deteriorates mechanical stability, so that a homogeneous merging is even more important for a proper mechanical stability (within a certain merging range) than a sufficiently high merging factor. Concluding, merging homogeneity is a decisive factor in terms of overall stability of the fabric 102. However, it is believed that the best results are obtainable by a combination of a uniform merging factor over the entire extension of the fabric 102 with a sufficiently high merging factor of at least 0.2%.

Merging control may be accomplished in an efficient way by an arrangement as the one shown in FIG. 13 in which multiple jets 122 with orifices 126 are serially arranged. A device 100 with a serial arrangement of multiple jets 122 involves a high number of adjustable parameters for functionally adjusting the fabric 102 for specifically meeting the needs of a certain application. In particular, such a configuration allows to bring fibers 108 of different layers 200, 202 into interaction prior to completion of coagulation and therefore precipitation of the fibers 108. By taking this measure, a multilayer fabric 102 with the following properties may be manufactured:

a) The first deposited layer 202 may be laid on fiber support unit 132 (for instance a transport belt). The latter may be embodied as a regular structure of retention mechanisms and air suction openings. In the statistical distribution of filaments or fibers 108, this has the effect that a higher material concentration can be found in areas to which no air flows. Such a (in particular microscopic) material density fluctuation can be interpreted as a perforation which has a tendency of pattern formation. At the positions where the air or water is ejected through the transport belt, very small pores may be formed in the fabric 102. Descriptively speaking, the second layer 200 may be interpreted as a reinforcement of the first layer 202, compensating potential homogeneity variations of the first layer 202.

Such an increase in tensile strength may be further increased by triggering fiber diameter variations within a respective layer 200, 202 and/or between the layers 200, 202. Such diameter variations may be diameter variations between different fibers 108, or diameter variations of one fiber 108 over various longitudinal sections thereof.

b) The merging properties of a multilayer fabric 102 may be adjusted so that merging related adhesion between adjacent layers 200, 202 is the same as merging related adhesion within a respective layer 200, 202 of the fabric 102. This can be achieved when fiber formation of a lower layer 200 is not yet completed when fibers 108 of the next layer 202 are deposited thereon. Such a merging control may prevent undesired layer separation.

c) A defined merging process may be supported by providing an adjustable adhesion promoting force to filaments of not yet fully coagulated lyocell spinning solution 104 in contact with one another. For instance, a contact pressure may be provided to keep such filaments in mutual contact during coagulation. Such a contact pressure may be exerted for example by air or water. This allows to adjust the cohesion between filaments of an individual layer 200, 202 and/or between layers 200, 202 during formation of a multilayer fabric 102.

As a result of the filament production using the described specifically configured lyocell manufacturing method, it can be ensured that process related heavy metal contributions are kept very small. For instance, the copper contamination of the fabric 102 according to an exemplary embodiment of the invention may be kept at a very low level of below 3 ppm. Also the nickel level may be kept very low. By such a low content of heavy metals in the manufactured fabric 102, the fabric 102 qualifies as highly appropriate for applications involving a contact with human beings or natural organisms.

A significant advantage of exemplary embodiments is the capability to form fabric 102 with multiple merging positions 204 but without the additional use of binders or adhesive material at the transition or interface between different fibers 108 or fiber regions (such as different layers 200, 202) with different physical properties but the same merging factor and hence the same mechanical strength.

Homogeneous merging adjustment in the vertical or thickness direction of a fabric 102 is in particular advantageous for a fabric 102 made from endless cellulose, since such a fabric type allows to manufacture different material properties (by specific functionalizations) in a similar process parameter window of the production (for instance swelling capability, hydrophilic character, oleophilic character, wicking, fluid retention capability, etc.).

In a further embodiment, the adjustment of a constant merging factor (for instance in a plane perpendicular to a thickness direction of the fabric 102) may allow to form cavity like structures, which are for instance highly appropriate for cleaning applications (for instance for wipes). Such structures or indentations can be formed in an ordered or in an irregular arrangement on the surface of the fabric 102. This also allows to adjust effects in terms of gripping of the fabric 102.

In yet another embodiment, a framework like microstructure can be formed in the fabric 100 in which oil can be stored. In conventional cellulose fabric, such an oleophilic surface of the cellulose is not present. It is particularly appropriate for applications in which oil or waxy preparations shall be integrated in the fabric 102 (as occurs for instance in case of wipes or dryer sheets). During normal use, the oil or waxy preparations can then be released from the fabric 100 into the surrounding environment, where the oil or waxy preparations may then serve as softener or the like.

It has also been found that a relatively high merging factor or number of merging positions 204 per area (or volume) of the sheet-like fabric 102 has a positive impact on the cleaning behavior of the fabric 102. It is presently believed that the high number of merging positions 204 results in a desired stiffness in combination with roughness which provides a cleaning function comparable with that of an abrasive paper. Therefore, a corresponding fabric 102 is particularly advantageous for wipes for use in a domestic home, in industry and for cosmetic applications.

In still another exemplary embodiment, the preferably overall constant merging factor (in particular in a thickness direction of the fabric 102) may be adjusted to obtain a particularly high oil storage capability. By controlling the process to obtain a high homogeneity, an equal formation of cavities may be obtained. On the other hand, a self-organization in a layer transition can result in a highly absorbing interior capillary system. Furthermore, a low density can also contribute to an intrinsic high oil retention capability (for example since a reinforced carrier system may prevent oil storing cavities from collapsing).

In a further preferred embodiment, a fabric 102 may be formed with fibers 108 having different diameters (in particular, different fibers may differ concerning diameter and/or different sections of one of the same fiber may differ concerning diameter). For instance, this may be adjusted by using multiple jets 122 with orifices 126 of different diameter and/or by adjusting a treatment of the lyocell spinning solution 104 in its stretching region spatially between the array 104 and the fiber support plate 132.

In another exemplary embodiment of the invention, the nonwoven cellulose fiber fabric 102 is used for a biodegradable product. After biodegradation, no binder material or adhesive material remains. In particular, no significant amount of heavy metals forms part of such a biodegradable product. Undesired abrasion of microparticles from the fabric 102 may be prevented by a corresponding design of the process.

In an embodiment, regular or irregular micro-variations of the merging factor may allow to form cavity-like structures within the fabric 102. Such an embodiment is particularly appropriate for wipes or the like. By taking such a measure, it is also possible to implement haptic effects for simplifying gripping of a nonwoven cellulose fiber fabric 102. Since such micro-variations may be designed so as to be compatible with the above described homogeneity of the merging factor, the micro-variation do not deteriorate the mechanical robustness of the fabric 102 according to an exemplary embodiment of the invention.

In still another exemplary embodiment, the smoothness of the surface of the fabric 102 may be influenced by merging control in such a way that microfibrillation occurs. In such an embodiment, the fibers 108 may hence comprise or consists of microfibrillar cellulose. Such a microfibril may be denoted as a very fine fibril, or fiber-like strand, consisting of cellulose. Cellulose fibers may be built up of fiber bundles, which may be composed of smaller elements called microfibrils. Through a fibrillation process, the cellulose fibers 108 may be converted at least partially into a three-dimensional network of microfibrils with a high surface area. As a result of the high purity and low heavy metals content of the fiber material, also the accurate formation of a microfibrillar structure is promoted. This allows to obtain a highly stable nonwoven cellulose fiber fabric 102 with a nevertheless smooth surface.

Summarizing, in particular one or more of the following adjustments may be made according to exemplary embodiments of the invention:

a low homogeneous fiber diameter may allow to obtain a high smoothness of the fabric 102 multilayer fabric 102 with low average fiber diameter may allow to obtain a high fabric thickness at a low fabric density equal absorption curves of the functionalized layers can allow to obtain a homogeneous humidity and fluid accommodation behavior, as well as a homogenous behavior in terms of fluid release the described connection of layers 200, 202 of fabric 102 allows to design products with low linting upon layer separation it is also possible to differently functionalize single layers 200, 202 so that products with anisotropic properties are obtained (for instance for wicking, oil take up, water absorption, cleanability, roughness) despite of the homogeneous merging properties.

Finally, it should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The words "comprising" and "comprises", and the like, do not exclude the presence of elements or steps other than those listed in any claim or the specification as a whole. The singular reference of an element does not exclude the plural reference of such elements and vice-versa. In a device claim enumerating several means, several of these means may be embodied by one and the same item of software or hardware. The mere fact that certain measures are recited in mutually different dependent claims does not indicate that a combination of these measures cannot be used to advantage.

In the following, examples for producing variations in the merging factor are described and visualized in the table below. Different merging factors in the cellulose fiber fabric may be achieved by varying the coagulation spray flow while using a constant spinning solution (i.e. a spinning solution with a constant consistency), in particular a Lyocell spinning solution, and a constant gas flow (e.g. air throughput). Hereby, a relationship between the coagulation spray flow and the merging factor, i.e. a trend of merging behaviour (the higher the coagulation spray flow, the lower the merging factor), may be observed. MD denotes hereby the machine direction, and CD denotes the cross direction.

| Sample ID | Coagulation spray flow l/h | Merging Factor % | Specific Hand MD [mN m$^2$/g] | Specific Hand CD [mN m$^2$/g] | Specific Hand Total [mN m$^2$/g] | Fmax cond. MD [N] | Fmax cond. CD [N] |
|---|---|---|---|---|---|---|---|
| 1.0 | 10 | 9.20 | n | n | n | 45.6 | 10.0 |
| 1.1 | 60 | 5.65 | 48.8 | 38.1 | 43.4 | 43.6 | 33.4 |
| 1.2 | 100 | 3.29 | 31.1 | 23.6 | 27.3 | 37.8 | 29.4 |
| 1.3 | 140 | 2.93 | 36.5 | 17.3 | 26.9 | 31.8 | 24.9 |
| 1.4 | 180 | 2.48 | 17.5 | 16.4 | 16.9 | 26.9 | 20.9 |
| 1.5 | 220 | 2.34 | 19.1 | 13.6 | 16.3 | 22.7 | 21.0 |
| 1.6 | 260 | 1.98 | 15.2 | 11.9 | 13.6 | 22.8 | 20.4 |
| 1.7 | 350 | 0.75 | 2.2 | 2.0 | 2.1 | 22.4 | 19.2 |

The softness (described by the known Specific Hand measuring technique, measured with a so-called "Handle-O-Meter" on the basis of the nonwoven standard WSP90.3, in particular the latest version as in force at the priority date of the present patent application) may follow the above described trend of merging. The tenacity (described by Fmax), for example according to EN29073-3, respectively ISO9073-3, in particular the latest version as in force at the priority date of the present patent application, may also follow the described trend of merging. Thus, the softness and the tenacity of the resulting nonwoven cellulose fiber fabric may be adjusted in accordance with the degree of merging (as specified by the merging factor).

The invention claimed is:

1. A nonwoven cellulose fiber fabric, directly manufactured from lyocell spinning solution, wherein the fabric comprises a network of substantially endless fibers, wherein the fibers are spatially_homogeneously merged substantially over the entire fabric, and wherein merging positions, at which at least a part of the fibers are merged, consist of the same material as the merged fibers, wherein a merging factor of the fibers differs over substantially the entire fabric by an absolute value of not more than 20%.

2. The fabric according to claim 1, wherein a value of the Young modulus differs over substantially the entire fabric by not more than 20%.

3. The fabric according to claim 1, wherein a merging factor of at least part of the fibers is in a range between 0.1% and 100%.

4. The fabric according to claim 1, comprising at least one of the following features:
wherein a smoothness, measured as specific hand, of the fabric is in a range between 2 mNm$^2$/g and 70 mNm$^2$/g;
wherein the fibers have a copper content of less than 5 ppm and/or have a nickel content of less than 2 ppm;
wherein at least part of the fibers are integrally merged with one another at merging positions;
wherein merging positions, at which at least a part of the fibers are merged, comprise a merging point at which fibers are merged with a point contact;
wherein merging positions, at which at least a part of the fibers are merged, comprise a merging line along which fibers are mutually aligned side-by-side at least over a portion of their length to form a superordinate fiber structure.

5. The fabric according to claim 1, wherein different ones of the fibers are located at least partially in different distinguishable layers.

6. The fabric according to claim 5, comprising at least one of the following features:
wherein fibers of different layers are integrally merged at at least one merging position between the layers;
wherein at least part of the fibers and/or at least one group of fibers is twisted.

7. A method of manufacturing nonwoven cellulose fiber fabric directly from lyocell spinning solution, wherein the method comprises
extruding the lyocell spinning solution through at least one jet with orifices-supported by a gas flow into a coagulation fluid atmosphere to thereby form substantially endless fibers;
collecting the fibers on a fiber support unit to thereby form the fabric;
adjusting process parameters so that the fibers are homogeneously merged substantially over the entire fabric, wherein the method comprises at least one of the following features:
wherein adjusting the process parameters for adjusting merging comprises forming at least part of the merging positions after the lyocell spinning solution has left the orifices and before the lyocell spinning solution has reached the fiber support unit by triggering an interaction between lyocell spinning solution extruded through different ones of the orifices;

wherein adjusting the process parameters for adjusting merging comprises forming at least part of the merging positions after the lyocell spinning solution has reached the fiber support unit by triggering coagulation of at least part of the fibers when laying on the fiber support unit;

wherein adjusting the process parameters for adjusting merging comprises serially arranging multiple jets with orifices along a movable fiber support unit, depositing a first layer of fibers on the fiber support unit, and depositing a second layer of fibers on the first layer before coagulation of at least part of the fibers at an interface between the layers has been completed;

wherein adjusting the process parameters for adjusting merging comprises triggering formation of such an amount of merging that a substantially continuous film-shaped fabric is obtained.

8. The method according to claim 7, wherein the method further comprises further processing the fibers and/or the fabric in situ after collection on the fiber support unit, in particular by at least one of the group consisting of hydroentanglement, needle punching, impregnation, steam treatment with a pressurized steam, and calendering.

9. A method of using a nonwoven cellulose fiber fabric according to claim 1 for at least one of the group consisting of a wipe, a dryer sheet, a filter, a hygiene product, a medical application product, a geotextile, agrotextiles, a clothing, a product for building technology, an automotive product, a furnishing, an industrial product, a product related to beauty, leisure, sports or travel, and a product related to school or office.

10. A product or composite, comprising a fabric according to claim 1.

* * * * *